United States Patent
Brown

(10) Patent No.: US 7,408,898 B1
(45) Date of Patent: Aug. 5, 2008

(54) FLEXIBLE NETWORK WIRELESS TRANSCEIVER AND FLEXIBLE NETWORK TELEMETRY TRANSCEIVER

(75) Inventor: Kenneth D. Brown, Grain Valley, MO (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 408 days.

(21) Appl. No.: 11/311,322

(22) Filed: Dec. 20, 2005

Related U.S. Application Data

(60) Provisional application No. 60/639,229, filed on Dec. 20, 2004.

(51) Int. Cl.
*H04Q 7/00* (2006.01)
(52) U.S. Cl. ............... 370/328; 370/250; 370/509; 455/127.2; 375/316
(58) Field of Classification Search ......... 370/328, 370/350, 509; 455/127.2; 375/316
See application file for complete search history.

(56) References Cited

U.S. PATENT DOCUMENTS

| | | | |
|---|---|---|---|
| 6,463,266 B1* | 10/2002 | Shohara | 455/196.1 |
| 6,667,993 B1* | 12/2003 | Lippett et al. | 370/509 |
| 2002/0142714 A1* | 10/2002 | Keith | 452/3 |
| 2003/0087617 A1* | 5/2003 | Shohara | 455/192.2 |
| 2003/0128719 A1* | 7/2003 | Doyle | 370/509 |
| 2005/0002480 A1* | 1/2005 | Chua | 375/347 |
| 2005/0147175 A1* | 7/2005 | Nakamura | 375/259 |
| 2006/0078069 A1* | 4/2006 | Seendripu et al. | 375/316 |
| 2007/0129025 A1* | 6/2007 | Vasa et al. | 455/114.2 |

\* cited by examiner

*Primary Examiner*—Danh C Le
(74) *Attorney, Agent, or Firm*—Fred A. Lewis; James C. Durkis; Paul A. Gottlieb

(57) ABSTRACT

A transceiver for facilitating two-way wireless communication between a baseband application and other nodes in a wireless network, wherein the transceiver provides baseband communication networking and necessary configuration and control functions along with transmitter, receiver, and antenna functions to enable the wireless communication. More specifically, the transceiver provides a long-range wireless duplex communication node or channel between the baseband application, which is associated with a mobile or fixed space, air, water, or ground vehicle or other platform, and other nodes in the wireless network or grid. The transceiver broadly comprises a communication processor; a flexible telemetry transceiver including a receiver and a transmitter; a power conversion and regulation mechanism; a diplexer; and a phased array antenna system, wherein these various components and certain subcomponents thereof may be separately enclosed and distributable relative to the other components and subcomponents.

28 Claims, 18 Drawing Sheets

FLEXIBLE NETWORK WIRELESS TRANSCEIVER AND FLEXIBLE NETWORK TELEMETRY TRANSCEIVER

CROSS REFERENCE TO RELATED APPLICATIONS

This application claims benefit of U.S. Provisional Application No. 60/639,229 filed Dec. 20, 2004.

FEDERALLY SPONSORED RESEARCH OR DEVELOPMENT PROGRAM

The present invention was developed with support from the U.S. government under Contract No. DE-AC04-01AL66850 with the U.S. Department of Energy. Accordingly, the U.S. government has certain rights in the present invention.

BACKGROUND OF THE INVENTION

1. Field of the Invention

The present invention relates broadly to systems and methods for providing communication between a vehicle or other platform and interested information consumers. More particularly, the present invention concerns a transceiver for facilitating two-way wireless communication between a baseband application, which is associated with a mobile or fixed space, air, water, or ground vehicle or other platform, and other nodes in a wireless network, wherein the transceiver provides baseband communication networking and necessary configuration and control functions along with application interface, baseband waveform processor, transmitter, receiver, and antenna functions to enable the wireless communication.

2. Description of the Prior Art

It is often desirable to receive, integrate, and make available information on a global scale. Such information might be produced in any of a number of different "grid" contexts, including, for example, vehicular contexts such as space, air, water, surface, and sub-surface grids, or location contexts such as world-wide, regional, local, and immediate grids. Increased capability and efficiency is possible when information from these different grids is integrated and available substantially anywhere, at any time, to any (authorized) user via a "global information grid". Unfortunately certain classes of mobile and fixed platforms are not currently integrated into this global grid, leaving a glaring gap or hole in the overall communication and information exchange and undermining global connectivity and interoperability among the various interested information consumers.

For example, the global information grid in a military context might integrate and make available information received from satellites, long-range and short-range aircraft, ships, wheeled and tracked vehicles, or foot soldiers and having to do with theater, regional, strategic, or tactical conditions. Unfortunately, several smart and dumb munitions and missiles used by the Armed Forces are not integrated into the global grid. As a result, command and control, intelligence, surveillance, reconnaissance, and weapon delivery platforms suffer from fragmented perspectives, stratified "kill-chain" processes, "stove-piped" infrastructure, poor interoperability and interconnectivity, limited infrastructure availability, limited data availability, and limited scope. Thus, there is a need for a data link transceiver for incorporation into these weapons in order to enable comprehensive global connectivity and interoperability between the various services, agencies, and policy makers.

Current commercial off the shelf (COTS) products do have limitations. For example, COTS 802.11 network hardware presents such issues as eavesdropping, security, intrusion, interference, range, fixed quality of service, latency, throughput, power efficiency, limited bandwidth, number of users, message prioritization, multiple access, fading RF channels, coverage area, environmental sensitivity, fixed modulation, etc. The availability of 802.11 based hardware has made it the premier choice for many researchers for the development of a wireless network to support network centric warfare. However, the ever increasing demands posed by the applications are stretching the 802.11 protocol beyond its intended capabilities. For example, 802.11 provides for no control over allocation of resources, and the default allocation policy is ill suited for multi-hop networks. Furthermore, senders with heterogeneous data rates can affect the system throughput adversely. The 802.11 allocates an equal number of transmission opportunities to every competing node. However, this fairness criterion can lead to low throughput when nodes transmit at widely different rates. This unfairness or bandwidth sharing presents itself as a significant quality of service problem for 802.11 networks. In addition, the 802.11 has latency problems when using the combination of voice, data and isochronous data packets at data rates of 1 and 11 Mbps. These factors along with the processing for handling security and encryption have negative impacts upon latency. This becomes a significant problem when targeting moving objects.

More generally, due to the above-identified and other problems and disadvantages encountered in the prior art, a need exists for a mechanism for incorporating and making available information generated by those mobile and fixed platforms not currently included in the global information grid.

SUMMARY OF THE INVENTION

The present invention overcomes the above-described and other problems and disadvantages in the prior art with a flexible wireless transceiver that facilitates two-way wireless communication between a baseband application, which is associated with a mobile or fixed platform, and other nodes in a wireless network, wherein the transceiver provides baseband communication networking and necessary configuration and control functions along with application interface, baseband waveform processor, transmitter, receiver, and antenna functions to enable the wireless communication.

More specifically, the transceiver provides a long-range wireless duplex communication node or channel between the base band application associated with a mobile or fixed space, air, water, or ground vehicle or other platform and other nodes in the wireless network or grid. The transceiver broadly comprises a communication processor; a flexible telemetry transceiver including a baseband waveform processor receiver and a transmitter; a power conversion and regulation mechanism; a diplexer; and a fixed isotropic or steerable phased array antenna system, wherein these various components and certain subcomponents thereof may be separately enclosed and distributable relative to the other components and subcomponents.

The network processor functions to produce network services and translates the analog or digital signal output of the baseband application to a digital stream having embedded control characters, addresses, and encryption so that the baseband application is compatible with the wireless network protocol. The communication processor also manages the communication process between the baseband application and the wireless network or the 802.x service and the wireless network, and executes all network data management processes. Future generations of the communication processor may be an optimum integration of network layers, MAC, physical layer baseband processors.

The flexible telemetry receiver (FTR) is a compact, lightweight, modular, portable, ruggedized, data communication RF/microwave receiver that provides an RF receive channel for the wireless network channel to the communication processor, and converts the received RF signals to baseband digital signals for use by the baseband waveform processor. The FTR amplifies weak RF signals, extracts data from the received carrier, and converts it to a number of standard waveforms such as JTRS waveforms which can be demodulated into a serial data stream with a corresponding synchronous clock. Each are distinct in function (voice, video, data), bandwidth (data rate), and modulation. It also functions to digitize and store a time record of the output IF signal for post-experimental laboratory analysis. The FTR can be adapted in real-time through several degrees of freedom in order to dynamically reconfigure for changing data rates, modulation type, selectivity, IF gain and bandwidth, IF frequency, sample rate, video bandwidth, and video, and to configure RF gain and manage noise performance. Furthermore, the FTR's design is scalable because it is modular with standard interfaces to facilitate logical substitution of RF, IF, and baseband segments in order the enable flexibility across a broad range of frequency and link margin applications (L, S, C, and X frequency bands, link margins, FH/DSSS, OFDM waveforms, multiple access, bandwidth, data rates). The FTR architecture is modular and incorporates standard interfaces, so it is capable of scaling to other frequency bands and other power levels to support a broad range of applications. The FTR includes a low noise amplifier (LNA); a frequency downconverter; a real-time demodulator; and a mass storage unit. The LNA amplifies very weak signals while minimizing the impact of noise, thereby producing sufficient signal-to-noise ratios at the frequency downconverter so that the modulating signal can be extracted in the demodulator. The frequency downconverter translates the S or L band microwave signal down to a standard first intermediate frequency (IF), where a range of adjacent second IF chains can be driven from a common IF frequency. The demodulator serves as a configurable baseband waveform processor which digitizes IF signals and filters and processes them within a CPLD digital signal processor such that BPSK, GFSK, GMSK, QPSK, or SOQPSK and eventually multi-h CPM modulated PCM data can be produced as a serial stream on the output. The mass storage unit digitizes the IF signals from the frequency downconverter and stores these samples internally for post-application laboratory digital signal analysis. The mass storage unit will provide standard (USB) interface for downloading of digitized IF data streams.

The distributed transmitter (DTX) provides an RF transmit channel from the communication processor and the wireless network channel, and converts the digital output of the communication processor to RF signals compatible with the wireless network channel. The DTX includes an input interface and an output interface; a digital modulator; a variable gain power driver amplifier; and a final power amplifier. The design of the DTX allows it to be physically distributed and still route high-speed signals from a remote source and the modulator.

The power conversion and regulation module (PCRM) provides power regulation and voltage conversion between the baseband application's power source and the voltage and current requirements for the transceiver. It maintains stable voltage levels over a range of load current demands. It also provides a power management function so that the transceiver can be put into a "sleep" mode in order to conserve system power, and also manages any requirements for sequencing of voltage applications.

The diplexer functions to isolate the transmit and receiver channels. The diplexer has separate bandpass filter networks for the transmit and receive channels which enables both channels to coexist on the same antenna system.

The phased array antenna system is capable of beam-forming and beam-steering the transmit and receive channels independent of each other. The antenna system has a variable radiation pattern beamwidth in azimuth and a fixed radiation pattern in elevation for both the transmit and receive channels. The transmit and receive radiation pattern can be electronically steered in azimuth only, i.e., no electronic elevation pattern steering is possible. However, this can be added later. The antenna system provides the ability to steer the peak of the transmit and receive radiation patterns toward the position of a distant transmitter and receiver. The antenna system includes a transmit antenna; a receive antenna; and a beam steering network. The phased array antenna has an automatic tracking processor which can be operated open or closed loop.

It will be appreciated from the description set forth herein that the transceiver of the present invention provides a number of substantial advantages over the prior art, including, for example, expanding the global information grid by integrating certain classes of mobile and fixed platforms whose generated information was not before integrated and made available to interested information consumers. In achieving this, the transceiver advantageously supports a range of network protocols such as, for example, 802.x, Link 16, or JTRS; a range of communication data rates, data rates, modulation types, and link margins; L, S, C, or X band frequencies; and integrated data security and integrated networking stacks. The transceiver also advantageously includes analog and digital signal processing to make both analog transducers and digital inputs compatible with the transceiver input interface, and both analog output signals and digital data stream output signals compatible with the baseband transceiver output interface. Furthermore, the antenna system can be isotropic for general applications or can be steered so that the baseband transceiver can be pointed in a desired direction or can track moving nodes.

The modular architecture of this system, the fact that it has been established, but not limited to 802.11.b, establishes interoperability with a host of existing network service stacks and application that have been deployed as part of the global grid on wired network services.

The fact that it is modular enables capabilities to customize a scale the interfaces to a host of applications, platforms, wireless channel problems. For instance the network interface will provide a standard service access point. Therefore a number of embedded computer systems can source data through the SAP. A number of plug and play computer standard interfaces (USB, Firewire, Ethernet) can be integrated as optional modules on the front end to form a "dual" stack resulting in conversion, adapting, or translation between the protocols and physical interfaces. On the wireless channel back end, because the transceiver is modular, the up/down frequency converters can be substituted so that the system can serve a number of frequency bands (L/S currently, but C, X, K bands) are possible. In addition the power amplifier, and the LNA can be changed to accommodate different bandwidth and frequency bands, and the output power stage and the LNA sensitivity can be changes to scale the system for different channel lengths or ranges leading to dynamic or scaled coverage areas. In addition, the efficiency of the power amplifier stage can be scaled leading to power saving modes and battery life extension or energy storage minimization.

The modularity also supports the notions of scaled or modular security and intrusion protection which can be integrated into the network processor at several layers.

Advanced modulation approaches such as CDMA, OFDM, MC-CDMA are possible leading to robust performance in the presence of fading channel conditions due to mobility, high data rates, multipath, and variable multi-media applications. These capabilities lead to advanced capabilities such as adaptive communication links that maintain QoS over a range of conditions. They also enable capabilities necessary for military applications requiring low probability of detection, low probability of intercept, and low probability of exploitation. It also expands several degrees of freedom for multiple access including time, frequency, code, spatial forms of multiple access.

The fact that the network processor has a custom MAC, now the QOS can be scaled such that throughput, efficiency, latency, etc. can be customized to support voice, video, or sensor data based on the application. Priority can be customized for the media access because not all messages are equal in importance. DSSS, or FHSS can be supported by the transceiver. This enables the MAC to manage configuration of the transceiver to deal with fading channels associated with multipath, Doppler, or interfering. Because the data rate is scalable, the QOS and fading effects can be offset by slowing the data rate to increase jamming margin, or if there is a big batch file (an image) that needs low latency, then high rates can be achieved, otherwise lower rates and narrow bandwidths can be utilized. Because the transceiver can support multiple modulation approaches, scaled spectral efficiency (2× or 3×) can be achieve, therefore minimizing bandwidth while using higher data rates. With the beam forming and beam pointing aspect of the phased array antenna and the scalable gain of the antenna, LPI/LPD can be achieved. There are cases where you want to minimize eavesdropping. Scaled user capacity can be achieved because the transceiver is capable of TDMA, CSMA, FDMA, or CDMA. Hybrids can be generated that utilize all these such that the network capacity can be increased. The KCP will package this system so that it is environmentally robust—therefore it can be militarized. Because the baseband processor for the transmitter and the receiver are rooted in complex programmable logic devices, waveform processing algorithms can be substituted such so that the transceiver channel can be scaled for a number of throughput capacities. Data coding techniques can be injected to generate coding gain such that the link margin can be increased (less errors). Interleaving can also be inserted such that sensitivity to frequency fading can be minimized. Frequency, time, multipath, and antenna diversity can be supported to also minimize sensitivity to frequency fading channels.

The general capabilities of the Flexible Network Transceiver produces the following benefits:

Integrated Network Centric military operations, processes, and applications
Distributed Wireless networking services
Geographic Area wireless data Networks for mobile distributed assets
Geographic area wireless connectivity
End to end reliable and secure data transfer
Standards based interoperability and interfaces between applications-extending wired like service to the battlespace.
Vertical (ground to space) integration and horizontal (large geographical areas) mesh connectivity.
Multipoint to multipoint, duplex data links to support voice, video, and data
Power management to maximize power supply life
Compact, lightweight, modular, hardware that is minimally intrusive to host system
Military qualified robustness
High rate, extended range, reconfigurable, wireless connectivity
Wireless connectivity is transparent to the user
When the FNT is miniaturized it will become less intrusive to the host system and will expand the scope of applications.
When the FNT is radiation hardened, it will enable the mobile platform to include deep space missions.
When a plug and play (PnP) interface is added to the FNT such that the FNT is compatible with a standard interface bus such as USB or Firewire, then the rapid embedding of the FNT can be accomplished. This enables very responsive communication links on a host of mobile platforms.

These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

With reference to the figures, a flexible network transceiver 20 is described, shown, and otherwise disclosed herein in accordance with a preferred embodiment of the present invention. Broadly, the transceiver 20 facilitates two-way wireless communication between a baseband application, which is associated with a mobile or fixed platform, and other nodes in a wireless network, wherein the transceiver provides baseband communication networking and necessary configuration and control functions along with transmitter, receiver, and antenna functions to enable the wireless communication.

More specifically, the transceiver 20 provides a long-range wireless duplex communication node or channel between the base band application associated with a mobile or fixed space, air, water, or ground vehicle or other platform and other nodes in the network or grid. The transceiver 20 supports a range of network protocols such as, for example, 802.x, Link 16, or JTRS; a range of communication data rates, data rates, modulation types, and link margins; L or S band frequencies; and integrated data security and integrated networking stacks. The transceiver 20 also includes analog and digital signal processing to make both analog transducers and digital inputs compatible with the transceiver input interface, and both analog output signals and digital output signals compatible with the transceiver output interface.

Figure 1:
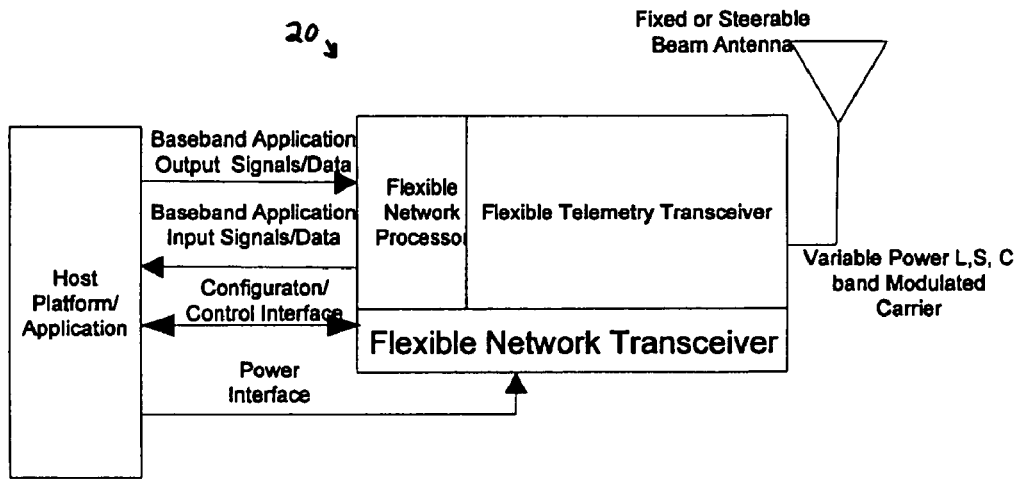
FIG. 1. Flexible Telemetry Network Application Specific FNT Architecture. The FNT functions to provide communication services between distributed mobile host applications, it provides wireless transmit, receive, antenna, and signal processing to translate baseband data and control signaling that it can propagate across the wireless channel. The host application interface support transfer of synchronization, data, and control signals. The wireless channel interface support transfer of TEM waves to and from the wireless channel.
Figure 2:
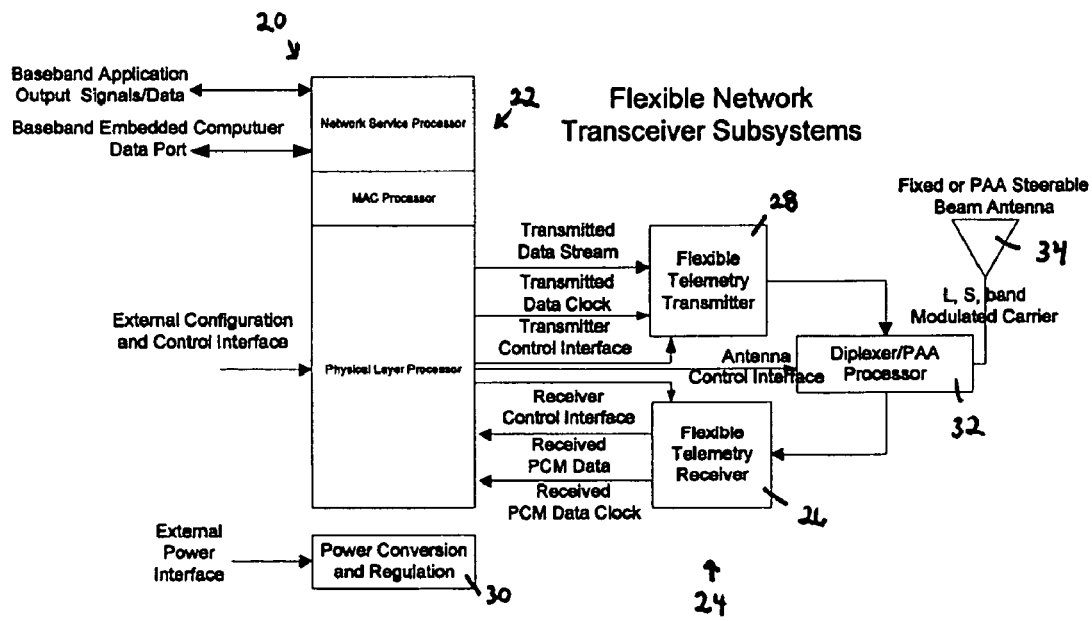
FIG. 2. Flexible Network Transceiver (FNT) Subsystem Architecture. Major FNT subsystems include the network processor, distributed transmitter, flexible telemetry receiver, and the phased array antenna. The major interfaces between these functions are also shown.

In the preferred embodiment shown in FIGS. 1 and 2, the transceiver 20 broadly comprises a communication processor 22; a flexible telemetry transceiver 24 including a receiver 26 and a transmitter 28; a power conversion and regulation mechanism 30; a diplexer 32; and a phased array antenna system 34. The receiver 26, transmitter 28, antenna 34, and communication functions are preferably provided in a number of small, separately distributable, modular enclosures, with a small transmitter chain and a small receiver chain. Such flexible distributability is disclosed generally in pending U.S. patent application titled "Distributed Data Transmitter", Ser. No. 10/271,459, filed Oct. 15, 2002, which is hereby incorporated by reference into the present application.

In broad terms, the transceiver 20 functions as follows to allow two-way wireless communication between the baseband application and the one or more other nodes in the wireless network. The communication processor 22 manages the communication process between the baseband application and the wireless network. The receiver 26 amplifies an RF signal received on a receive channel from the wireless network, extracts data from a modulating signal component of the RF signal, and converts the data to a serial data stream with a corresponding synchronous clock. The transmitter 28 provides an RF transmit channel from the communication processor 22 and for providing a wireless network channel, and converts a digital output of the communication processor 22 to RF signals compatible with the wireless network channel. The power conversion and regulation mechanism 30 provides power regulation and voltage conversion between a power source associated with the baseband application and the transceiver 20. The diplexer 32 isolates the receive and transmit channels. The phased array antenna system 34 allows for beam-steering a receive radiation pattern associated with the receive channel and an transmit radiation pattern associated with the transmit channel to achieve maximum effect.

Communication Processor

The communication processor 22 functions to translate the analog or digital signal output of the baseband application to a digital stream having embedded control characters, addresses, and encryption so that the baseband application is compatible with the wireless network protocol. The communication processor 22 manages the communication process between the baseband application and the wireless network or the 802.x service and the wireless network. The communication processor 22 also executes all network data management processes, and is co-located or independent CPLD/EPLD/FPGA with the transmitter/receiver baseband processors.

Figure 3:
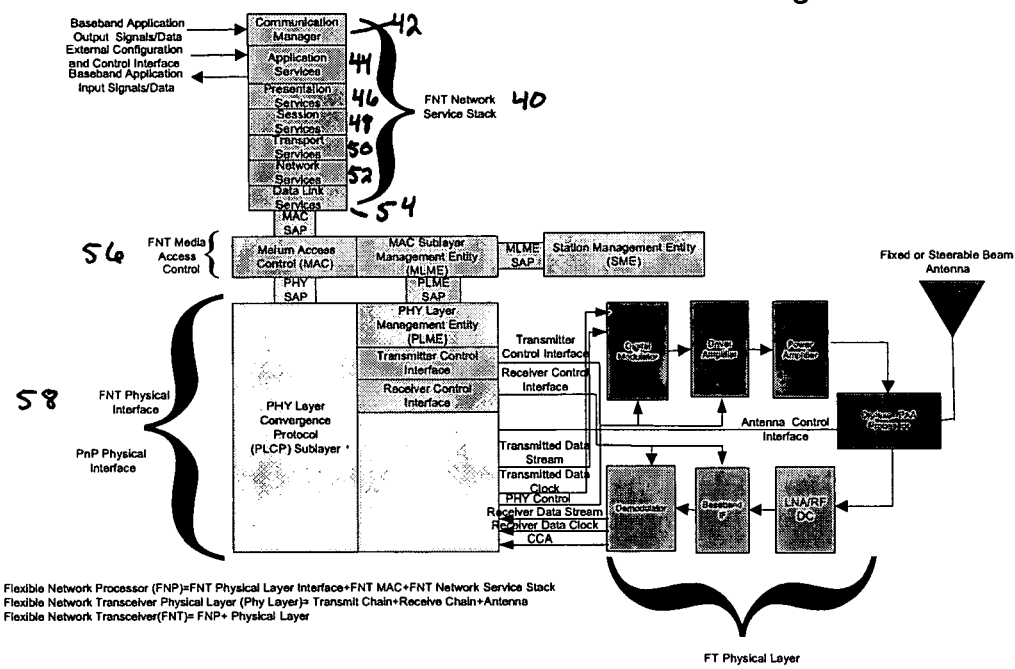
FIG. 3. FNT Subsystem Architecture. This is a more detailed diagram of the architecture in FIG. 2.

Referring particularly to FIG. 3, the communication processor 22 can be partitioned into several subcomponents including a network communication stack 40 and a communication manager 42. The network communication stack 40 is modeled on the OSI framework, implements a layered approach, and includes the following managers: application 44, presentation 46, session 48, transport 50, network 52, data link 54, media access control 56, and physical layer service 58. The application manager 44 can handle application services as simple as email and as complex as Internet, World Wide Web (WWW), or distributed grid computing.

A wireless network station is created by the combination of the media access controller (MAC) 56, the physical layer service manager 58, and the transmitter 24. The MAC 56 implements an interface between the data and physical layers. On the back end, the physical layer service manager 58 supports data and clock interfaces to the receiver 26 and transmitter 28 and also a configuration and control interface to these components 26,28 to control the wireless physical layer. The communication processor 22 is baselined on existing 802.11 standards and serves to make the wireless network transparent to the higher level protocols and user applications, making the wireless physical layer appear transparent so that users have the same services they would expect from a wired land network. In this manner the wireless network functions similar to a wired 802.x network. If desired, the network communication stack 40 can be integrated with the transmitter and receiver baseband processing (discussed below) to make the overall footprint and volume of the transceiver 20 smaller and its operation faster.

The communication manager 42 enables an external control and configuration interface for the communication processor 22. The application service manager 44 supports a bidirectional baseband analog or digital signal interface for data acquisition. In this manner, it is capable of supporting data links for a range of applications. The application service manager 44 also supports an 802.x data port so that the communication processor 22 can serve as a gateway access point for long-haul Internet services. This effectively enables the nodes in the wireless network to distribute data across the Internet and the WWW.

Flexible Telemetry Receiver

The Flexible Telemetry Receiver (FTR) functions to amplify weak S band signals from a wireless channel and to frequency translate and demodulate the original data stream. The FTR is based on a modular programmable signal processor and microwave signal processors. The low noise amplifier and RF downconverter sections are capable of variable filter and amplifier gains. The downconversion mixer is driven by a programmable carrier synthesizer enabling operation in a range of frequency bands. A modular IF section enables a number of external and or internal demodulators and waveform digitizers. The modular baseband programmable signal processor is capable of digitizing, synchronizing, filtering, and extracting data bits from modulated IF signals. It reconstructs the original data stream with a synchronous clock. The FTR functional prototype has not been miniaturized, but currently planned volume and mass targets are approximately 10 Cu inches and weigh approximately 0.25 pounds. Additional reductions in form are anticipated.

Additionally, the FTR enables frequency, sensitivity, dynamic range, Eb, No bandwidth, and waveform modulation management. Similar and complementary to the DTX, frequency management is implemented at two resolutions. Coarse trades in the form of substitute downconvert modules affording selection of L, S, C, X, K band operation. Fine discrete resolution trades are achieved with tuning within each frequency band. The FTR also provides capability for RF bandwidth and gain management affecting the minimum detectable signal, dynamic range, and interference levels. These parameters affect Eb delivered to the demodulator. Additionally the FTR enables IF frequency, bandwidth, and gain management. Frequency plan management enables shifting of desired signals away from interference observed at the RF input. Switchable IF filtering enables noise bandwidths tailoring. IF automatic gain control maintains Eb observed at the demodulator input over a large RF input dynamic range. These RF and IF elements combine to provide system tradeoffs in the FTR for Eb and No delivered to the demodulator. The FTR demodulator also enables data rates and waveform modulation management resulting in effects on Eb, No, and the BER relationships. The FTR is physically distributable throughout a host system leading to mass properties, contiguous volume, thermal, and EMI performance management.

Figure 4:
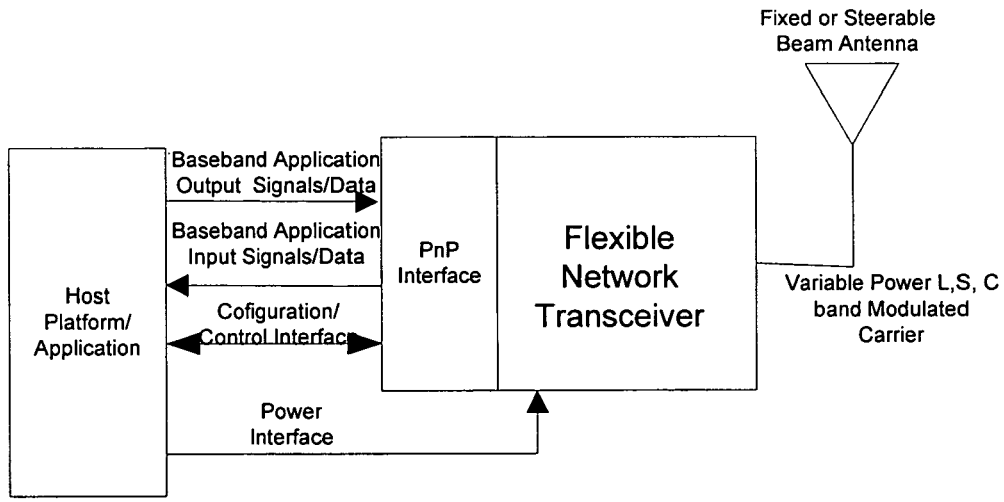
FIG. 4. Space Plug and Play Avionics (SPA) Application Specific FNT System Architecture. PnPFNT functions to provide communication services for a host application that are rapidly integrated into the host application. This is accomplished through a SPA-U/S/E interface. There are several types of SPA-X interfaces. SPA-U is based on the USB standard. SPA-S is based on the PC firewire standard. SPA-E is based on networking Ethernet standard. The PnPFNT is similar to the baseline FNT, except it has included the SPA-U interface that enables rapid integration into a host communication bus. The host application interface supports transfer of synchronization, data, and control signals while the output interface support an RS-422 serial or 16 bit digital interface to the FNT.
Figure 5:
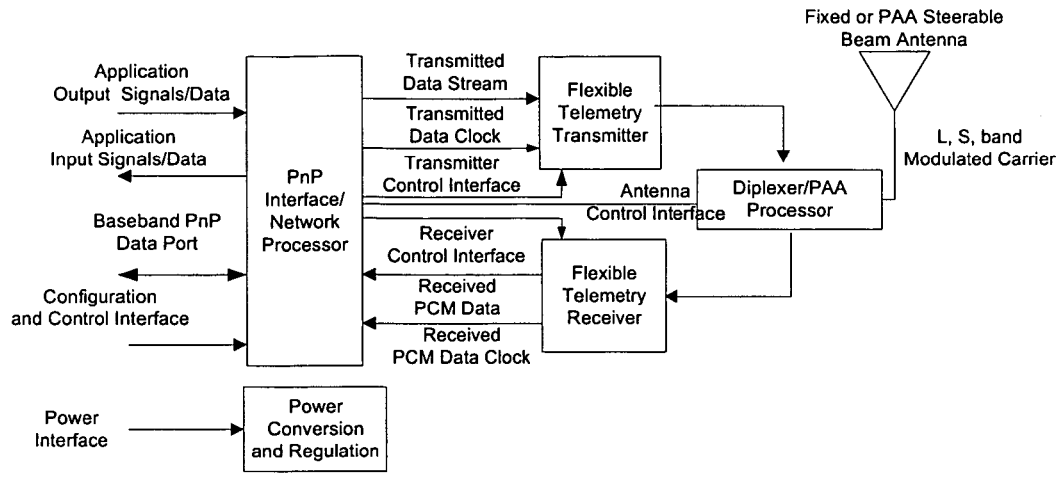
FIG. 5. Space Plug and Play Avionics (SPA) Application Specific FNT Subsystem Architecture. Major subsystems for the PnPFNT are shown to include the SPA-U processor along with the standard baseline function and interfaces for the FNT.

Therefore, the FTR enables system trades providing tailoring of primary range equation and data link quality of service relationships, resulting in reduced communication constraints. See FIGS. 4 and 5.

Figure 6:
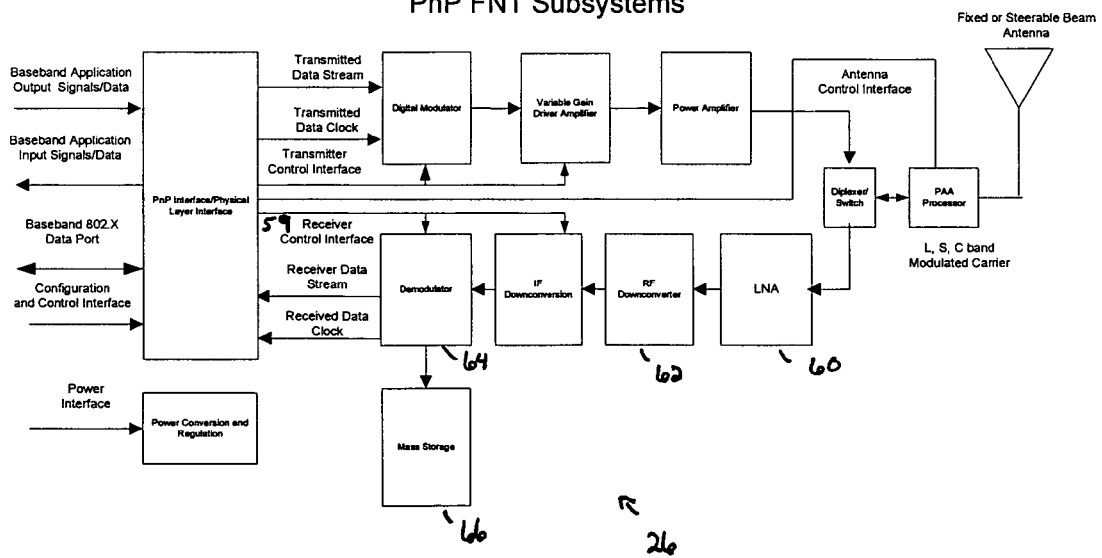
FIG. 6. Space Plug and Play Avionics (SPA) Application Specific FNT Subsystem Architecture. This is a more detailed diagram of the architecture shown in FIG. 5.
Figure 7:
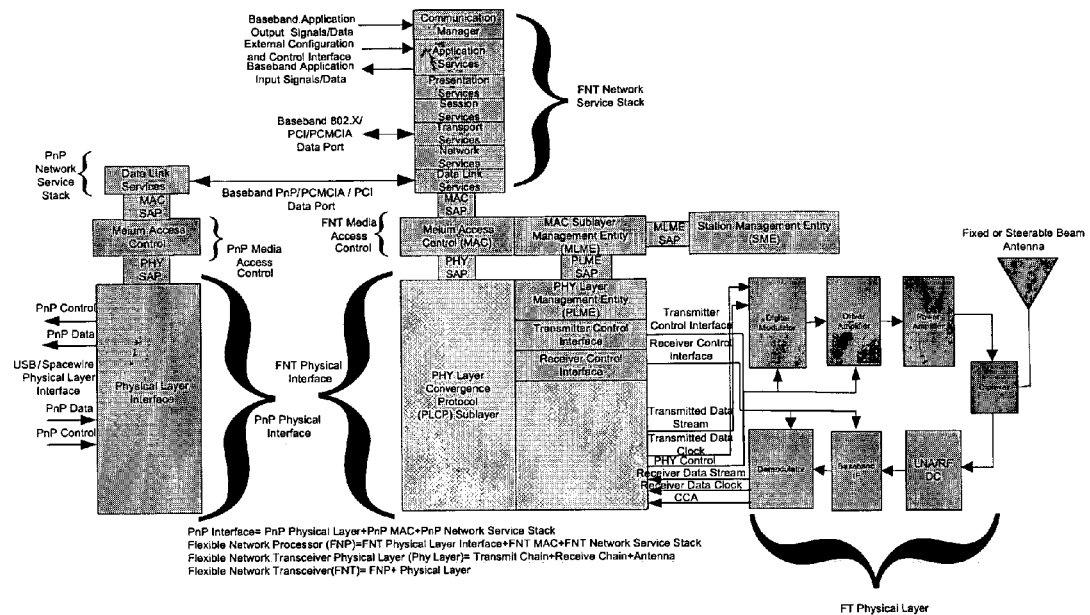
FIG. 7. Satellite PnP Transceiver Block Diagram. This is a more detailed diagram of the system represented in FIG. 6.
Figure 8:
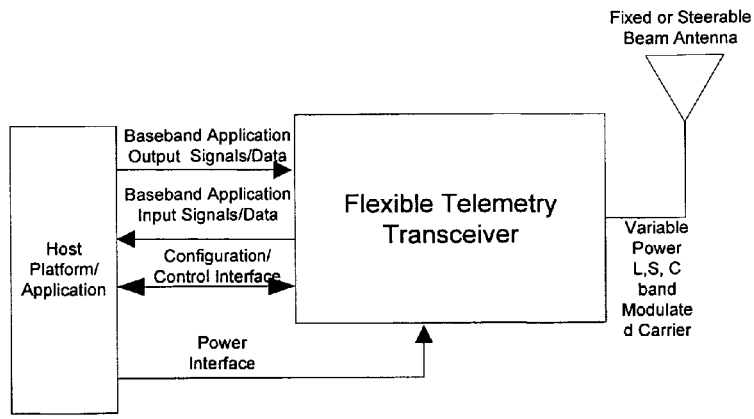
FIG. 8. Basic Telemetry Data Transceiver FNT System Architecture. The Telemetry Data Link Transceiver functions to support point to point transfer of point to point data. The host application interface supports synchronization, data, and control signals between the host and the FTT. The wireless channel interface supports transfer of TEM waves between the channel and the FTT.
Figure 9:
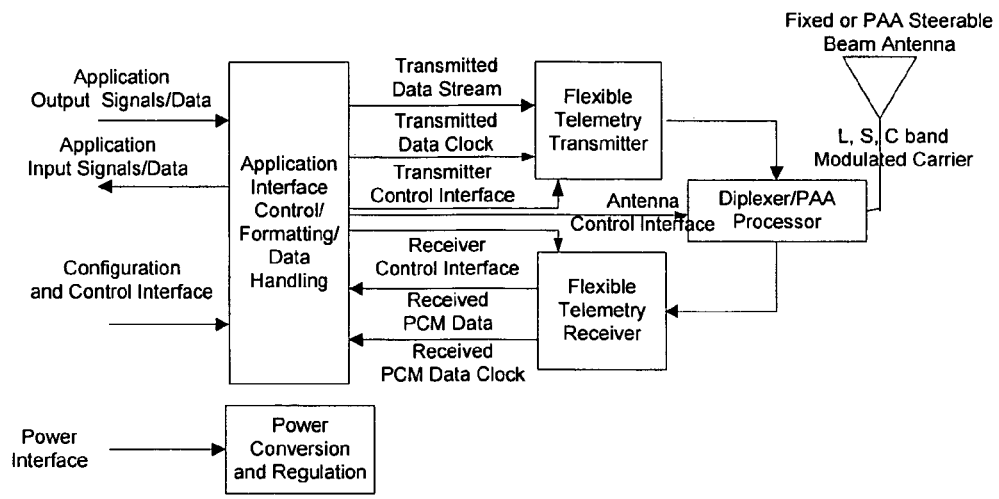
FIG. 9. Data Transceiver FNT Subsystem Architecture. The major subsystems for the Flexible Telemetry Data Link are shown including the DTX, FTR, and PAA.
Figure 10:
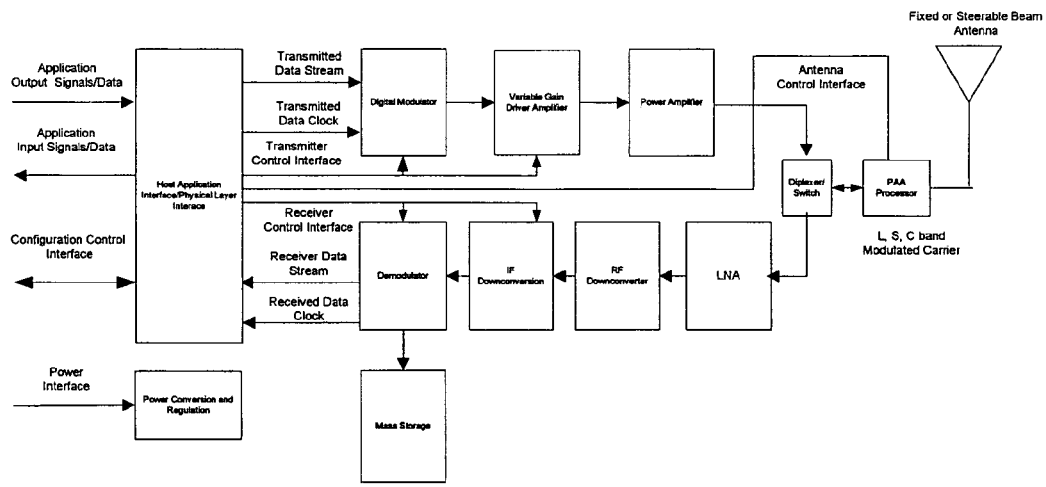
FIG. 10. Basic Telemetry Data Transceiver FNT Subsystem Architecture. This is more detailed diagram of the architecture shown in FIG. 9.
Figure 11:
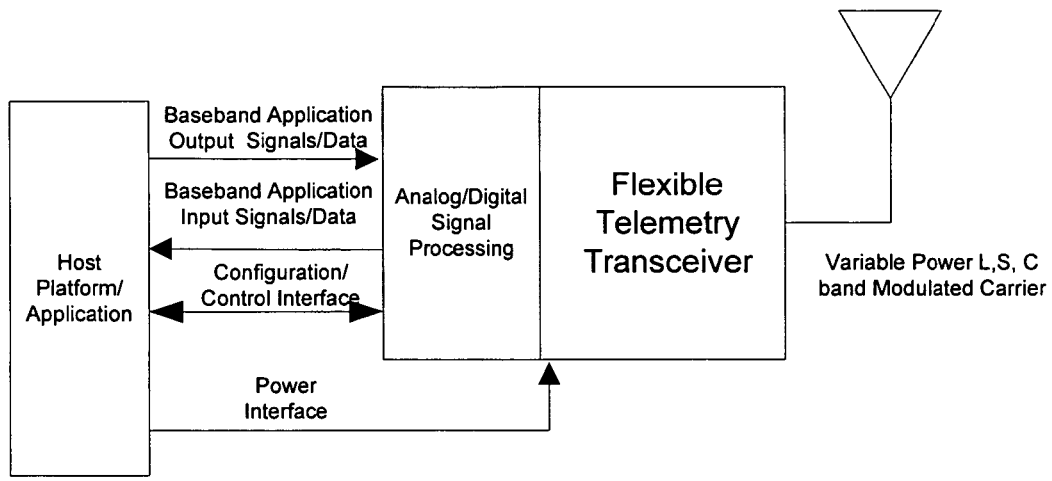
FIG. 11. Weapons Data Link Application Specific FNT Architecture. The Weapons Data Link (WDL) transceiver functions t to provide communication services between distributed mobile weapons applications, it provides wireless transmit, receive, antenna, and signal processing to translate baseband data and control signaling that it can propagate across the wireless channel. The weapon application interface support transfer of synchronization, data, and control signals. The wireless channel interface support transfer of TEM waves to and from the wireless channel.
Figure 12:
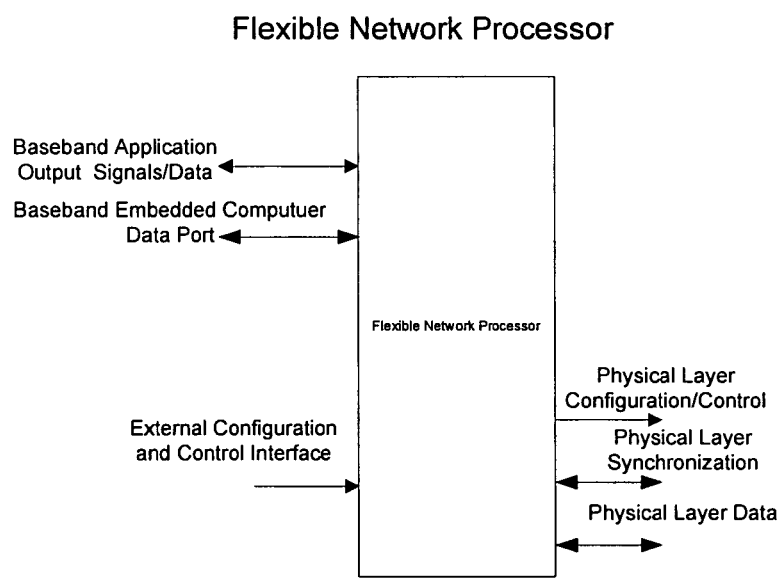
FIG. 12. Flexible Communication Processor System Architecture. The FNP functions to provide L1-L6 protocol services that support communication of data and C2 information between the host application and the FNT physical layer. Host application interface supports transfer of synchronization, data, and control signaling. The physical layer interface supports transfer of synchronization, configuration, signaling to the DTX, FTR, and PAA.
Figure 13:
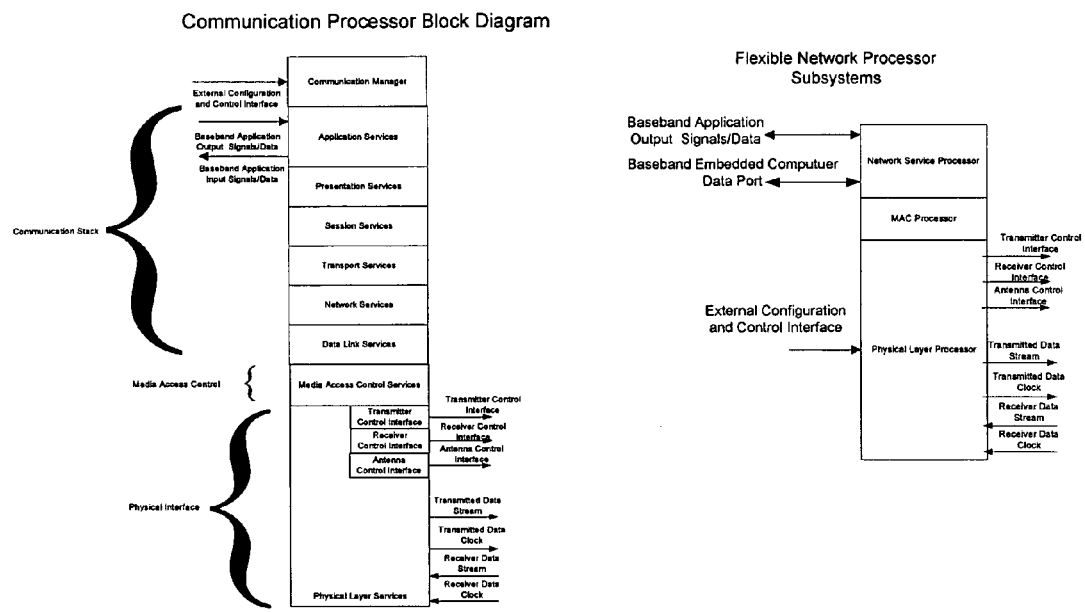
FIG. 13. Flexible Communication Processor Subsystem Architecture. Major FNP subsystems are shown including the network service stack (NSS), Media Access Controller (MAC), physical layer interface, Distributed transmitter, Flexible Telemetry receiver, and the phased array antenna. Major interface signals between the subsystems are also shown.
Figure 14:
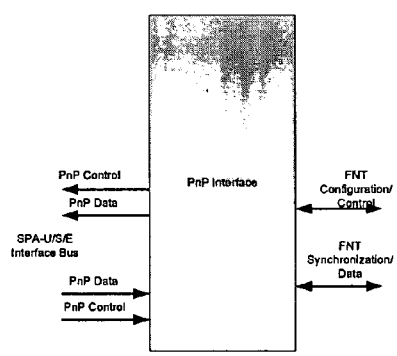
FIG. 14. SPA-U/S/E Plug and Play Interface System Architecture. The PnP Interface functions to provide USB-2.0, Firewire, and/or Ethernet protocols in order that the FNT can be rapidly integrated into the host application. The host interface is a standard interface for USB/Firewire/or Ethernet. The interface to the physical layer also supports transfer of data, synchronization, and or configuration signaling.
Figure 15:
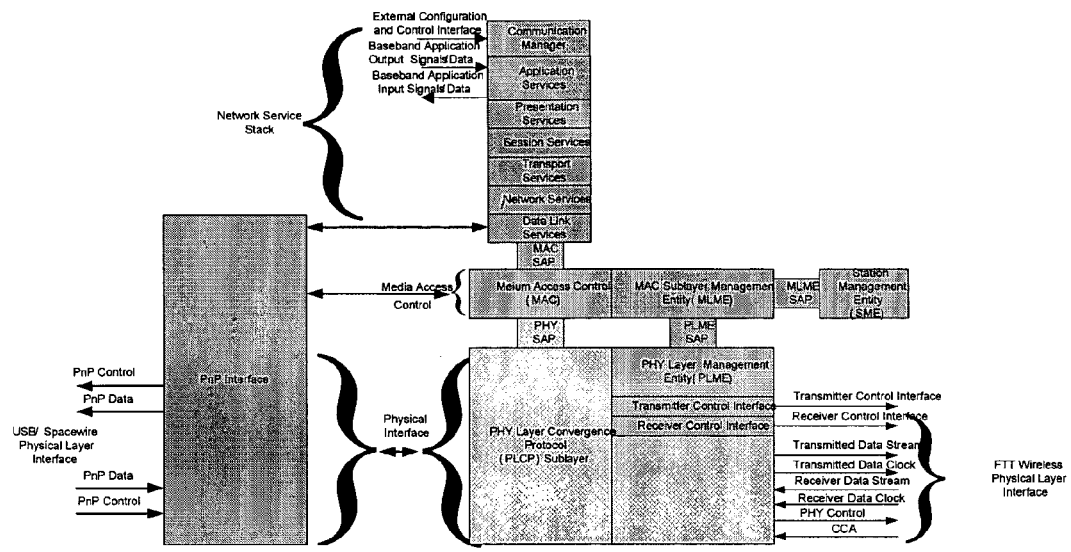
FIG. 15. SPA-U/S/E Plug and Play Interface Subsystem Architecture. This diagram represents the combination of FIGS. 13 and 14.
Figure 16:
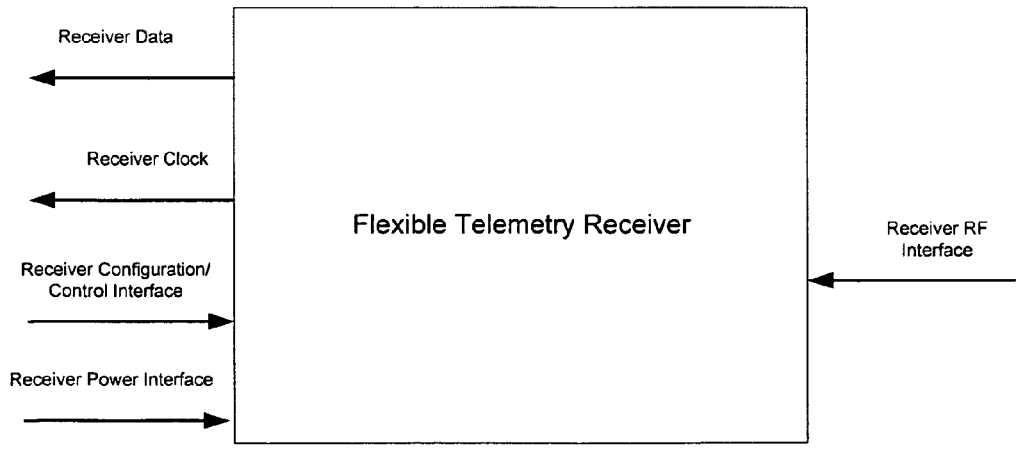
FIG. 16. Flexible Telemetry Receiver System Architecture. The FTR functions to amplify, frequency translate, and demodulate communication signals received from the antenna. It reduces the RF signal to a baseband signal that can be processes by the host application. The physical layer interface supports transfer of synchronization, data, and configuration signaling.
Figure 17:
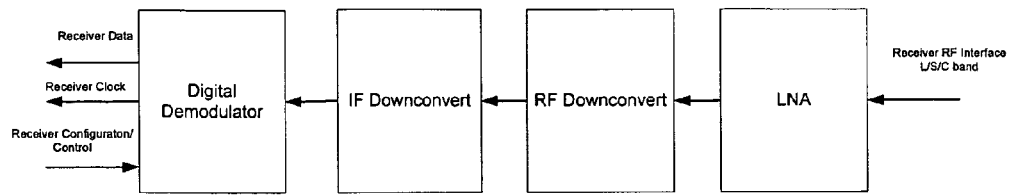
FIG. 17. Flexible Telemetry Receiver Subsystem Architecture. Major subsystems for the FTR are shown; they include the LNA, RF Down converter, IF section, and demodulator. Primary signal interfaces are also shown.
Figure 18:
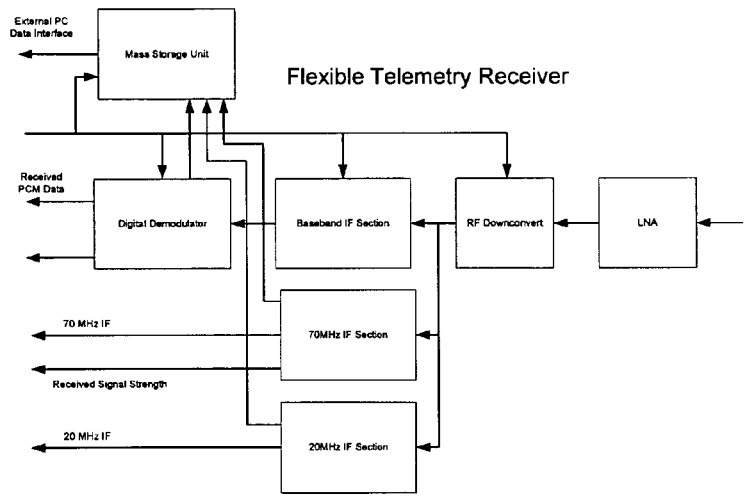
FIG. 18. Flexible Telemetry Receiver Subsystem Architecture. This diagram is a more detailed representation of FIG. 17.
Figure 19:
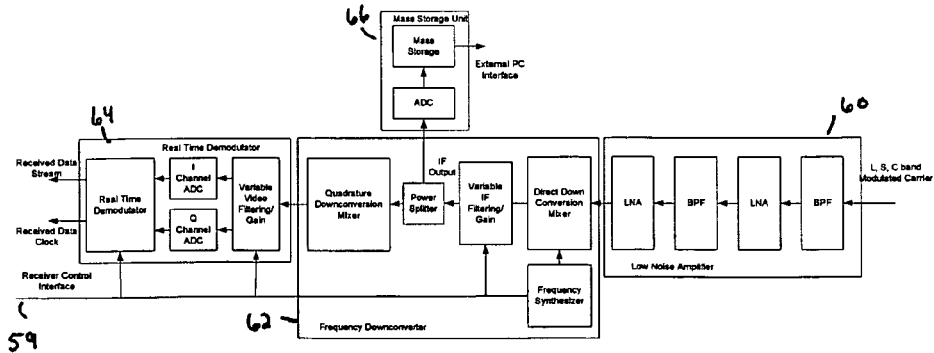
FIG. 19. Flexible Telemetry Receiver Subsystem Architecture. This diagram is a more detailed representation of FIG. 18.
Figure 20:
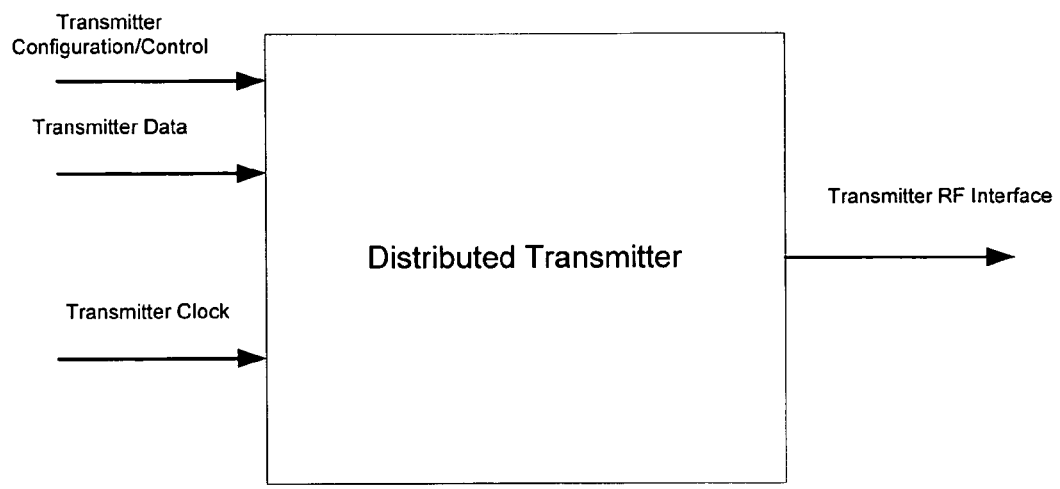
FIG. 20. Distributed Transmitter System Architecture. The DTX functions to modulate, frequency up converter, and amplify host application signals so that are compatible with the wireless channel. The physical layer interface supports transfer of data, synchronization, and configuration signals. The antenna interface supports transfer of output RF power signals.

Referring particularly to FIG. 6, the flexible telemetry receiver (FTR) 26 is a small, modular, portable, ruggedized, data communication RF/microwave receiver that functions to provide an RF receive channel for the wireless network channel to the communication processor 22, and converts the received RF signals to baseband digital signals for use by the communication processor 22.

The FTR 26 functions to amplify weak RF signals, extract data from the received carrier, and convert it to a serial data stream with a corresponding synchronous clock. It also functions to digitize and store a time record of the output IF signal for post-experimental laboratory analysis. These RF signals are typically sent through a wireless channel over long ranges. These RF signals could be received from, for example, distant ground transmitters, near-Earth airborne transmitters, low-Earth orbiting transmitters, or even transmitters in geostationary orbit. The FTR's design is modular to facilitate logical substitution of the RF, IF, and baseband segments in order the enable flexibility. This enables the FTR 26 to flex across a broad range of applications. It can also be adapted in real-time through several degrees of freedom so that it can be dynamically reconfigured for changing data rates, modulation type, selectivity, IF gain and bandwidth, IF frequency, sample rate, video bandwidth, and video gain can change, and to configure RF gain and manage noise performance. The operation of the FTR 26 can be controlled and configured through a control and configuration interface 59. For example, the configuration of the demodulator 64, the gain and bandwidth of the IF and video sections, and the IF frequency can be controlled through this interface 59, thereby extending the functional applications of the FTR 26.

The FTR 26 includes the control and configuration interface 59; a low noise amplifier (LNA) 60; a frequency downconveter 62; a real-time demodulator 64; and a mass storage unit 66. All are manufactured with standardized PCB and surface-mount component manufacturing approaches and enclosed in gold-plated aluminum housings, and each may be separately enclosed and distributable relative to the others. This makes the FTR 26 deployable for airborne or field applications that require small, low power, flexible solutions, and because the FTR 26 is reconfigurable and application-adaptable in a number of physical and functional dimensions it can provide solutions to a range of data link applications. The input to the FTR 26 is a low level RF signal in the L, S, or C band. The output can be a variable IF signal, baseband data stream, quadrature data stream, system clock, or a PC USB interface. The data and clock outputs provide digital serial streams; the clock is synchronous with the data rate.

The LNA 60 amplifies very weak received signals while minimizing the impact of noise. In this manner, it produces sufficient signal-to-noise ratios at the frequency downconverter 62 so that the modulating signal can be extracted in the demodulator 64. The LNA 60 has several stages of low noise fixed gain amplifiers and fixed band pass filtering.

The frequency downconverter 62 is a fixed, single stage downconverter which translates the S, L, or C band microwave signal down to a standard first intermediate frequency (IF), where a range of adjacent second IF chains can be driven from a common IF frequency. Because the first IF frequency is standard, the RF section can be interchanged to support a broad range of input frequencies including UHF, L, S, C, or X band. This enables the IF section and demodulator 62 to be reused across all these bands. The first IF frequency is fixed in frequency. The IF section provides a second stage of frequency translation and adaptable gain for each output channel for optimizing application-specific performance. With multiple IF outputs, the IF section can be utilized to simultaneously drive digitizers with external standard rack mount demodulators, or the integrated demodulator 64 and/or mass storage unit 66. At the second IF frequency, filter bandwidths and amplifier gains can be managed more effectively. The frequency downconverter 62 has programmable frequency synthesizers so that the second stage IF frequency can be managed for each output independently based on the application.

The frequency downconverter 62 provides multiple, multiple pole, RF bandpass filtering, with sufficient bandwidth to cover the S, L, or C band. Sufficient roll-off from the multiple poles provides multiple decades dB of attenuation from the high and low frequency band edges. The frequency downconverter 62 has multiple, fixed bandwidth MHz filters, and a switchable bank of variable bandwidth filters, to control noise levels. The frequency downconverter 62 further includes PLL frequency tracking to compensate for variation in received signal frequencies. The frequency downconverter 62 further includes a fixed frequency downconversion mixer with an output amplifier. The frequency downconverter 62 has three independent outputs that can simultaneously support digitizers, external demodulators, or an embedded demodulator. Each IF channel has an independent frequency synthesizer so that each output frequency can be independently managed. There is a switchable filter band to enable management of noise on each of the outputs. The embedded digital demodulator channel has an embedded direct quadrature mixer to produce frequency scalable I and Q output signals. Each of the IF channels has an AGC to maintain the output of the IF channel at a fixed signal level despite dynamic changes in the input signal levels.

The demodulator 64 digitizes IF signals approximately between 1 MHz to 100 MHz, and supports data rates approximately between 0.1 Mbps and 40 Mbps, and filters and processes these within a CPLD digital signal processor such that FSK or SOQPSK modulated PCM data can be produced as a serial stream on the output. Because the demodulator 64 is based on reconfigurable CPLD technology, other advanced modulation types, such as CPM, DSSS, FHSS, OFDM, and MC-CDMA modulation, can be added as well. A synchronous data clock can also be output by the demodulator 64. The demodulator 64 digitizes the quadrature input signals and provides digital filtering and processing to extract the PCM data stream from the incoming quadrature signals. It includes a switchable variable video filtering/gain section, an I/Q analog to digital converter, and a real-time demodulation processor. The demodulator 64 also provides fixed 35 MHz filters with an option to upgrade to switchable BW video filtering. An LVDS interface for the clock and data outputs can be added to extend the range from the FTR to the network processor for high rate data streams.

The mass storage unit 66 digitizes the IF signals from the frequency downconverter 62 and stores these samples internally for post-application laboratory digital signal analysis. The digitizer sample rates can be configured to cover a range of IF signal rates. A deep-flash memory subsystem enables storage of time records between 10 minutes and 30 minutes depending on the sample rate. A standard USB interface enables the data to be transferred from the mass storage unit 66 to a personal computer.

With regard to power consumption, the RF section of the FTR 26 operates at 5V and internally regulates the power bus. It provides internal regulation of any voltages that are required. It requires approximately 200 mA of current resulting in 1 W of power. The IF section operates at 5V and also provides internal regulation of all required voltages. It requires approximately 200 mA of current resulting in 1 W of power. The demodulator 62 operates at 5V and requires approximately 600 mA of current resulting in 3 W of power. The entire FTR system requires 5 W of power to function. If system power is not available, battery power, and power converters are available.

Thus, in broad terms, the components of the FTR 26 function and cooperate as follows in order to amplify the received RF signal, extract data from the modulating signal component of the RF signal, and convert the data to a serial data stream with a corresponding synchronous clock. The control and configuration interface 59 allows for controlling operation and configuration of the FTR 26. The low noise amplifier 60 amplifies the RF signal while minimizing any noise effects, thereby producing a sufficient signal-to-noise ratio so that the modulating signal component can be extracted from the RF signal. The frequency downconverter 62 translates the modulating signal component down to a standard first intermediate frequency. The demodulator 64 digitizes, filters, and processes the intermediate frequency signal to extract the data therefrom. The mass storage unit 66 digitizes, at a particular sample rate, the intermediate frequency signal from the frequency downconverter 62 to producer a sample, and stores the sample for subsequent analysis.

The FTR 26 is preferably based on technology that is a hybrid of COTS and in-house microwave and digital solutions leveraging the best of class from both domains to yield a product that performs within performance, footprint, volume, and mass requirements. Best of class digital CPLD, analog to digital converters, discrete filters, custom logic, etc were chosen to optimize FTR performance. In one contemplated implementation, some approximate preferred performance values are as follows:

| | |
|---|---|
| minimum detectable signal level | −115 dBm to −120 dBm; |
| dynamic range | 60-80 dB; |
| spurious free dynamic range | 30-50 dB; |
| overall RF gain | 30-50 dB; |
| IF gain | 15-30 dB; |
| video gain | 30-50 dB; |
| S band RF bandwidth | 100 mHz; |
| IF bandwidth | selectable between 1 MHz and 36 MHz with 5+ ranges; |
| input VSWR | <1.2; |
| maximum RF input signal level | −50 dBm; |
| minimum detectable signal level | −114 dBm; |
| overall noise figure | 3-5 dB; |
| image rejection | 50+ dB; |
| spurious response rejection | 80 dB; |
| LO re-radiation rejection | 40+ dB; |

Because the IF frequency is configurable with a frequency synthesizer, the second IF frequencies can be established within a range of 1 MHz to 100 MHz, with a resolution of 1 MHz. Because AGC and PLL frequency tracking is utilized in the frequency downconverter 62, dynamic mobile applications can be supported. Custom RF and IF stripline and microstrip filtering enables the FTR 26 to have a compact volume. Utilizing RF and IF MMIC amplifiers and mixers yields a very compact RF and IF section.

Potential applications for the FTR 26, beyond the transceiver 20 of the present invention, include stand-alone reception of point-to-point data links where small, low power, rugged performance is required. This includes, for example, mobile airborne, ground, and marine receivers. The FTR 26 can also be joined with a transmitter to form a small, rugged, data link transceiver.

Figure 33:
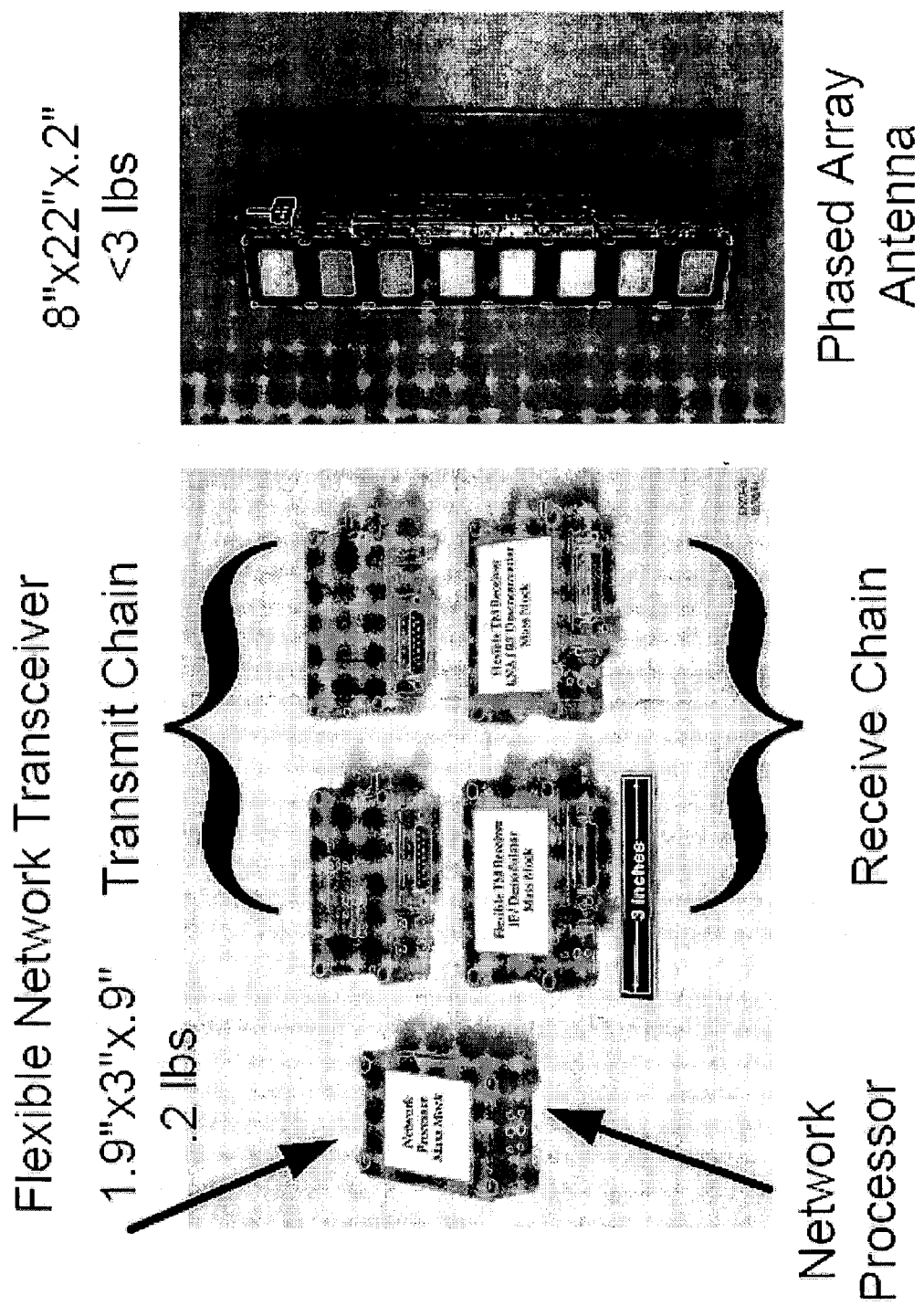
FIG. 33. Flexible Network Transceiver and Phased Array Antenna. This diagram depicts the physical characteristics of the FNT and PAA.

The footprint of the FTR 26 is flexible depending on the deployment, and is approximately 1.9 inches×3.0 inches if the enclosures are stacked. Alternatively, if the enclosures are distributed side-to-side or end-to-end, the footprint is, respectively, 3.8 inches×3.0 inches or 1.9 inches×6.0 inches. The volume of the FTR 26 is approximately 1.9 inches×3.0 inches×1.8 inches, or 10.29 cubic inches, and the mass is approximately 0.35 pounds. See FIG. 33.

The mechanical enclosures for the FTR 26 are fabricated from aluminum and are gold-plated to improve conductivity and solderability. Each enclosure supports two volumes, one on the top and another on the bottom, for electronic PCB. Each volume has a lid to seal the volume. The enclosures have filtered RF feed-through for connectivity between each of the PCB volumes, and have cutouts to support SMA and D-sub connectors to route RF and baseband signals into the electronic volumes. The enclosures support isolated or non-isolated mounting configurations. Each enclosure can be mounted with four #2 bolts to a solid, threaded, substrate, and either directly on top of each other and secured with four bolts, or mounted flat, adjacent each other's sides or ends, with eight mounting bolts.

The electrical interface can be functionally partitioned as follows. The RF input utilizes an SMA connector and 50 Ohm input impedance. The IF outputs also use SMA connectors and 50 Ohm output impedance. The IF output operates at −30 to −15 dBm level. The data and clock outputs can be single-ended SMA connectors or LVDS through the 15-pin D-sub connector. The operating levels of these outputs are 3.3V CMOS levels with configurable impedances. The configuration and power interface to each module is also through a 15-pin filtered D-sub connector. Filtered connectors are preferred in order to minimize EMI effects external to each enclosure.

The FTR 26 is designed to withstand 100 G's of Haversine shock with a duration of 5 ms seconds. It is also designed for several vibration modes including worstcase 30 G's of random vibration from 0 to 2000 Hz for a duration of worstcase 4 hours, and to function approximately between −20° C. and +65° C. It can withstand non-operation temperature ranges of approximately between −40° C. and +125° C. It supports up to a 95% non-condensing humidity environment, and operates at all atmospheric pressure levels.

Flexible Telemetry Transmitter

The Distributed Transmitter (DTX) functions to modulate an S band carrier with input digital data stream and amplifies the power of this signal so that it can be transmitted across a wireless channel. The DTX is based on a modular baseband programmable signal processor, and microware signal processors. The baseband waveform processor can accommodate numerous modulation, waveshaping filters, signal synthesizers, etc. leading to a plethora of signal types. The modular frequency upconverter with a programmable carrier synthesizer enables operation in a range of frequency channels. The modular power amplifier driver with a programmable gain interface and modular output power stages enables a broad range of dynamic link margins. The phased array antenna with dynamic beam forming and steering enables a range of sweeping, tracking, or gain control capabilities. The DTX has not been miniaturized, but current volume and mass specifications are approximately 10 Cu inches and weighs approximately 0.25 pounds. Additional reductions in form are anticipated.

The DTX enables tradeoffs of data rates providing Eb management. It also can host several forms of waveform modulation providing trades for BER relationships between Eb, No, and Pe which is a function of modulation. It enables RF average power management also directly effecting Eb. It enables passband frequency management at two resolutions; the crudest offers substitute upconversion modules enabling trades for L, S, C, X, K band performance. A finer degree of discrete resolution is achievable with digital tuning within each band. Frequency management affords range equation channel losses, antenna gain, and antenna aperture management because they are a function of wavelength also effecting several elements of link margin. The DTX power amplifier also operates in either optimum power or optimum efficiency modes, affording trades between maximizing range, signal to noise, and/or system power consumption. Amplifier linearity management results in trades of distortion and/or Eb, both affecting BER. Physical modularity enables distribution of the DTX subsystem throughout the host resulting in mass property, contiguous volume, thermal, and EMI performance management.

Therefore, the DTX enables several system trades affording primary range equation and data link quality of service management reducing communication constraints.

Figure 21:
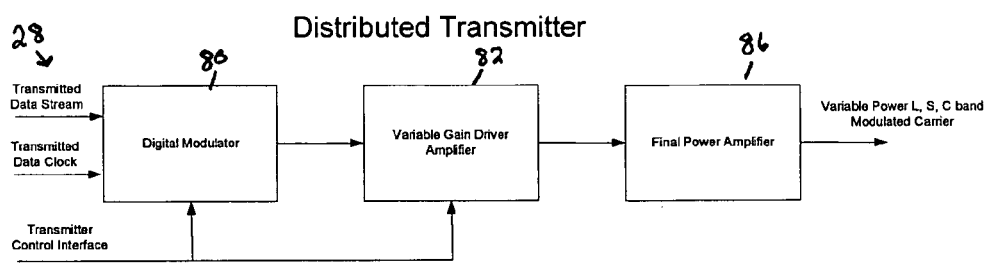
FIG. 21. Distributed Transmitter Subsystem Architecture. Major subsystems for the DTX are shown; they include the modulator, RF Up converter, PA driver, and Power Amplifier. Primary signal interfaces are also shown.
Figure 22:
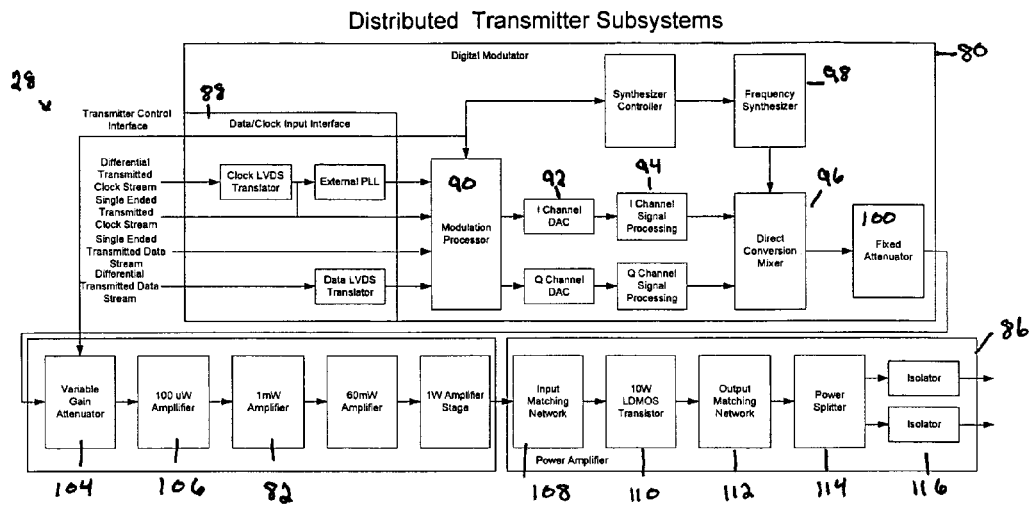
FIG. 22. Distributed Transmitter Subsystem Architecture. This diagram is a more detailed representation of the architecture depicted in FIG. 21.
Figure 23:
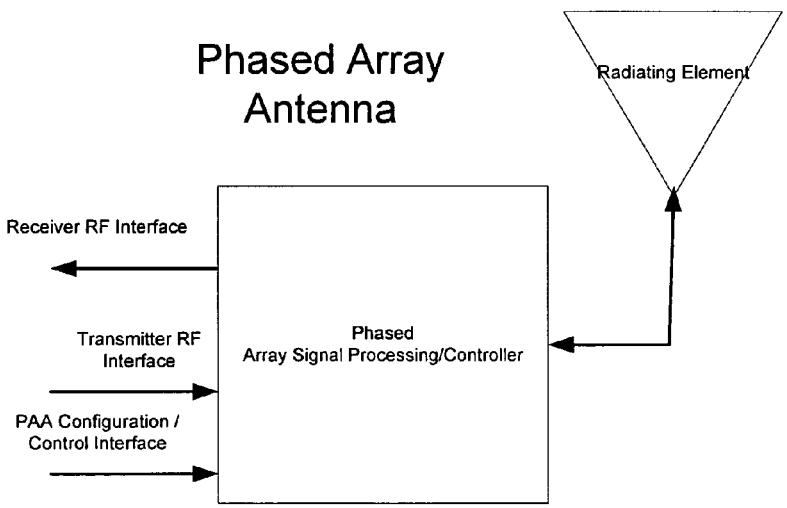
FIG. 23. Phased Array Antenna System Architecture. The PAA functions as a transducer between the wireless channel TEM waves and the electrical signals that the FNT processes. The transmitter and receiver interfaces support transfer of RF signals to and from the antenna. The channel interface supports transfer of TEM waves to and from free space.

Referring particularly to FIGS. 21 and 22, the flexible telemetry transmitter (FTT) 28 functions to provide an RF transmit channel from the communication processor 22 and for providing a wireless network channel, and converts the digital output of the communication processor 22 to RF signals compatible with the wireless network channel. The FTT 28 includes an input interface and an output interface; a digital modulator 80; a variable gain power driver amplifier 82; and a final power amplifier 84. The input interface supports both data and clock inputs, and the output interface can support one or two antenna outputs.

The digital modulator 80 includes two data/clock interfaces 88; a modulation processor 90; I/Q digital-to-analog converters 92; I/Q signal processors 94; a quadrature direct mixer 96; a frequency synthesizer 98; and an output fixed attenuator 100. The driver amplifier 82 includes a variable gain attenuator 104 and a four stage amplifier 106. The power amplifier 86 includes input matching networks 108; an LDMOS transistor 110; a power splitter 112; output matching networks 114; and output isolators 116. The power splitter 112 supports multiple outputs, and the isolators 116 block reverse signals from entering the output of the amplifier 86.

With regard to the two data/clock interfaces 88, the data input can be either single-ended or differential, and the differential input is compatible with the Low Voltage Differential Standard (LVDS). This enables the FTT 28 to be physically distributed and still route high-speed signals from a remote source and the modulator 80. The RF output can be a single or a double output for driving a single or double antenna system. Both outputs are 500 hm compatible and provide up to 25 dB of reverse isolation to reduce load sensitivity. The FTT 28 can provide between 1 mW and 10 W of output RF power. The 65 dB fixed gain of the driver and power amplifiers 82,86 can be varied over a range of approximately 30 dB. The modulation processor 90 has an integrated direct digital synthesizer and digital processor that produces the I and Q signals necessary to implement FSK, SOQPSK, or CPM modulation. Digital waveshaping filtering and a symbol mappers are also included in the modulation processor 90. Internal system clocks can be generated by a clock multiplier from an external data clock. The direct conversion mixer 96 provides a quadrature mixer that converts the frequency of the baseband quadrature signals to RF directly.

Advanced communication waveforms can be produced by the DTX with additional development. These include DSSS, FHSS, CDMA, OFDM, and MC-CDMA. These waveforms will support advanced capabilities to adaptively compensate for fading channel and dynamic application conditions.

Power Conversion and Regulation Mechanism

The power conversion and regulation mechanism (PCRM) 30 provides power regulation and voltage conversion between the baseband application's power source and the voltage and current requirements for the transceiver 24. It maintains stable voltage levels over a range of load current demands. It also provides a power management function so that the transceiver 20 can be put to sleep in order to conserve system power, and also manages any requirements for sequencing of voltage applications. The PCRM 30 includes a set of DC-to-DC converter blocks and voltage regulators for each of the power supplies required by the transceiver 20.

Diplexer

The diplexer 32 functions to isolate the transmit and receiver channels. The diplexer 32 provides at least approximately 80 dB of isolation between these channels. It has separate bandpass filter networks for the transmit and receive channels which enables both channels to coexist on the same antenna system. The bandwidth of each filter provides up to approximately 32 MHz of passband and no more than approximately 4 dB of insertion loss. The diplexer 32 provides channel spacing within the S band frequency bands.

Phased Array Antenna

The Flexible Phased Array Antenna (FPAA) is based on a linear array of microwave patch antennas, RF signal processing, beam forming and steering networks, and digital control processors. The antenna can operate manually with open loop control for beam pointing or can operate automatically with closed loop control for tracking moving targets. The PAA has not been fully miniaturized, but currently is targeted for approximately 8"×22"×2" and less than 3 pounds.

The Phased Array Antenna (PAA) functions to transform the electrical signals from the transmitter into electromagnetic waves that can propagate across the wireless channel. In a similar manner it functions to transform weak electromagnetic waves that strike the antenna into electrical signals that the receiver can process. It is based on an array of microwave patch antennas, RF signal processing, beam steering networks, and digital control processors. The antenna can operate manually with open loop control for beam forming and/or pointing or can operate automatically with closed loop control for tracking moving targets. The PAA prototype occupies approximately 8"×22"×2" and weighs less than 3 pounds. Reductions in form are anticipated. Additionally, the FPAA enables gain, beam width, and beam steering management. Active gain management enables potential reduction of required transmit power for a given link margin. Beam width management affects antenna directivity, and effectively the energy on target, Eb and BER of the link. Beam steering angle management enabled by automatic digital tracking on moving targets, maintains the spatially sensitive main beam directly on the data source or sink. This enables the user to reduce pointing errors and perhaps interference effects by null steering at interference sources, effectively achieving higher Eb/No yielding lower error rates.

Therefore, the FPAA enables system trades enabling management of primary range equation and data link quality of service relationships resulting in reduced communication constraints.

Figure 24:
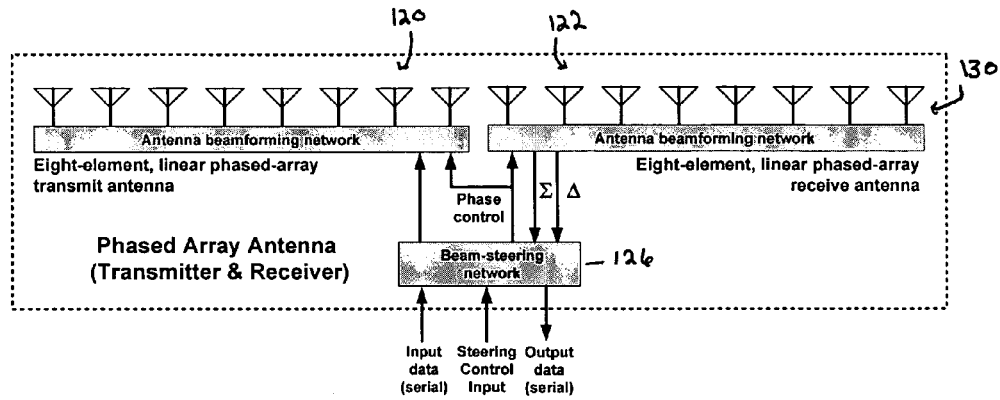
FIG. 24. Phased Array Antenna Subsystem Architecture. Major sub systems for the PAA are shown. Major signal interfaces are also shown.
Figure 25:
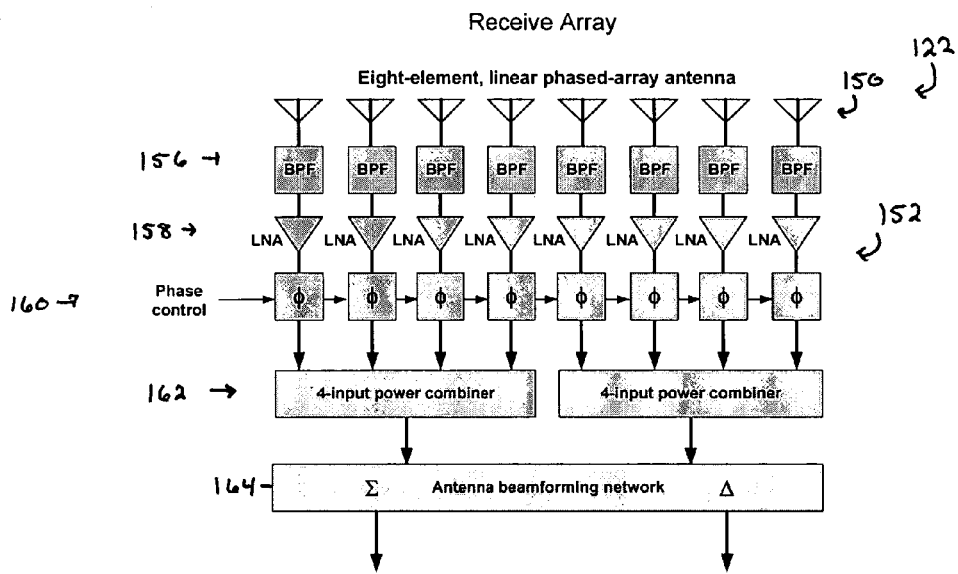
FIG. 25. Phased Array Antenna Subsystem Architecture. This is a more detailed diagram of the Receive Array depicted in FIG. 24.
Figure 26:
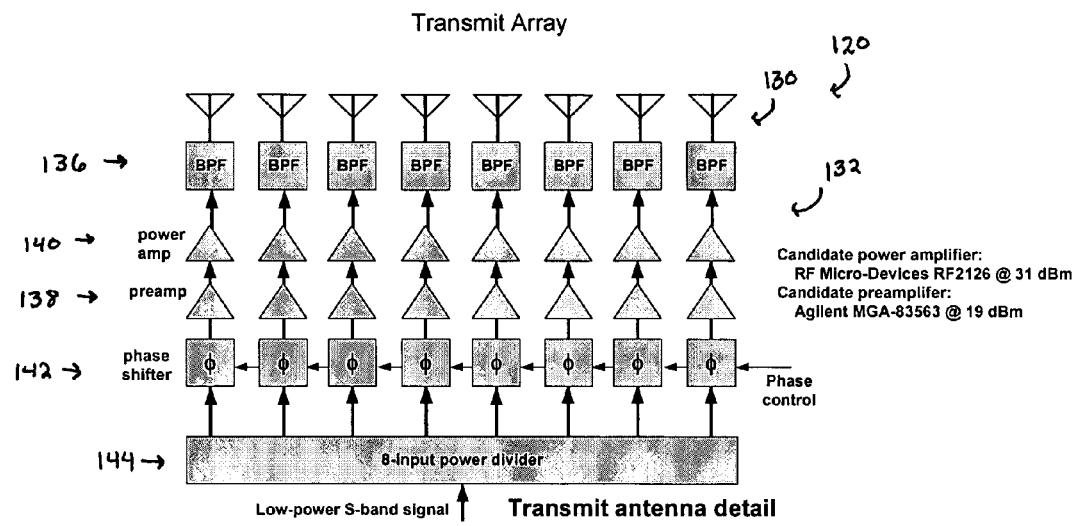
FIG. 26. Phased Array Antenna Subsystem Architecture. This is a more detailed diagram of the Transmit Array depicted in FIG. 24.
Figure 27:
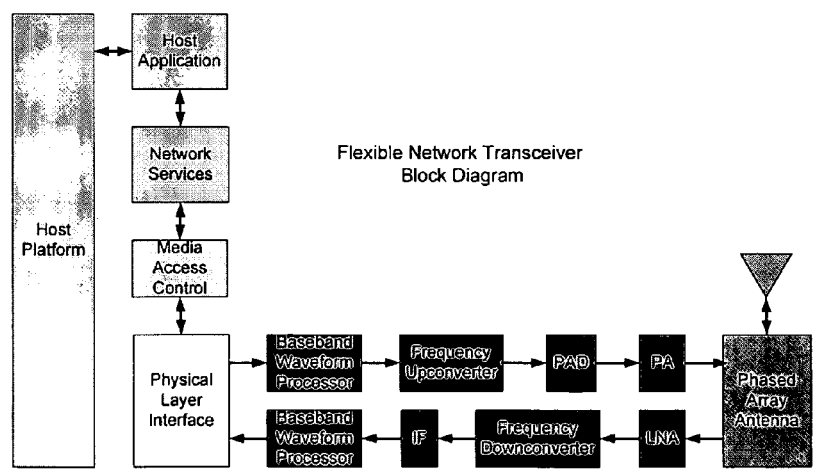
FIG. 27. FNT Application Specific Architecture. This is a generic FNT block diagram which serves as the basis for comparison with FIGS. 28 and 29.
Figure 28:
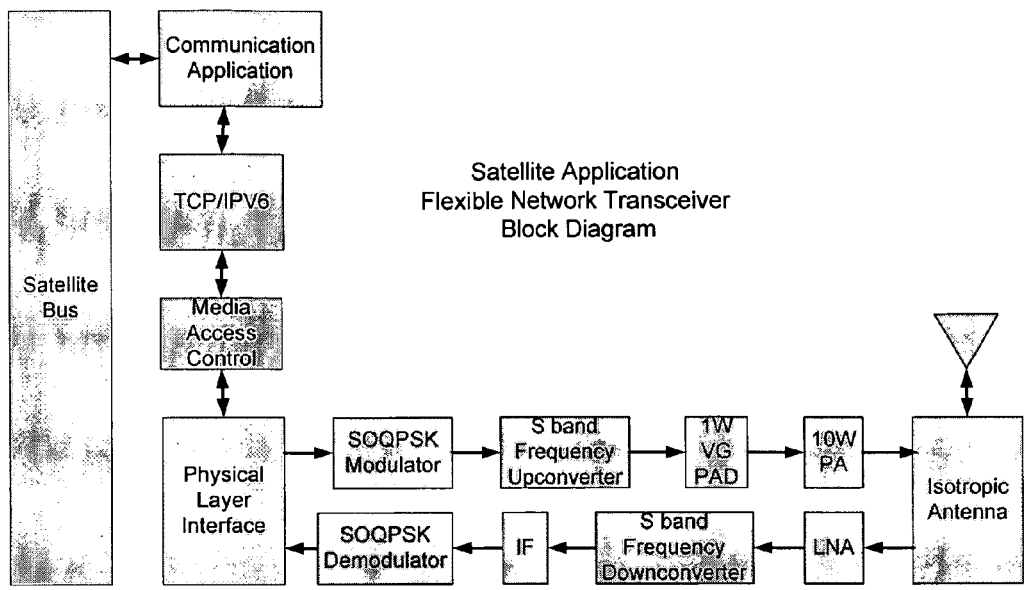
FIG. 28. Application Specific FNT Architecture. Network Centric Satellite Application Architecture. An FNT configuration to support a network centric LEO satellite application is shown. The frequency up/down convert, modulation/demodulation, power, and antenna subsystems are configured to support a hypothetical application.
Figure 29:
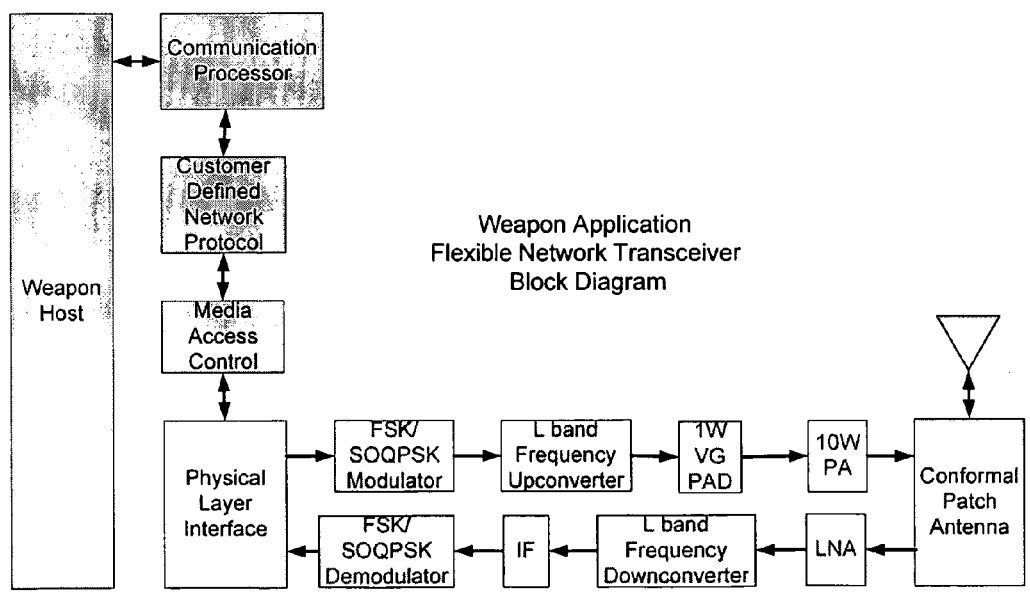
FIG. 29. Application Specific FNT Architecture. Network Centric Weapon Data Link Application Architecture. An FNT configuration to support a network centric weapons network data link application is shown. The frequency up/down convert, modulation/demodulation, power, and antenna subsystems are configured to support a hypothetical application.
Figure 30:
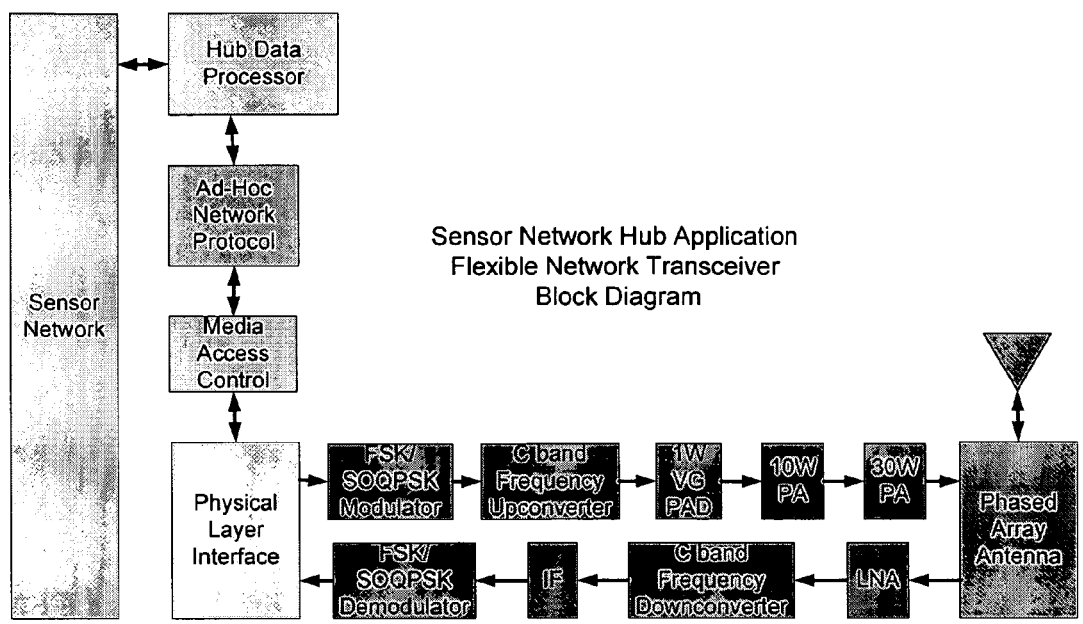
FIG. 30. Application Specific FNT Architecture. Network Centric Ground Sensor Network Application Architecture. An FNT configuration to support a network centric ground sensor network data link application is shown. The frequency up/down convert, modulation/demodulation, power, and antenna subsystems are configured to support a hypothetical application.
Figure 31:
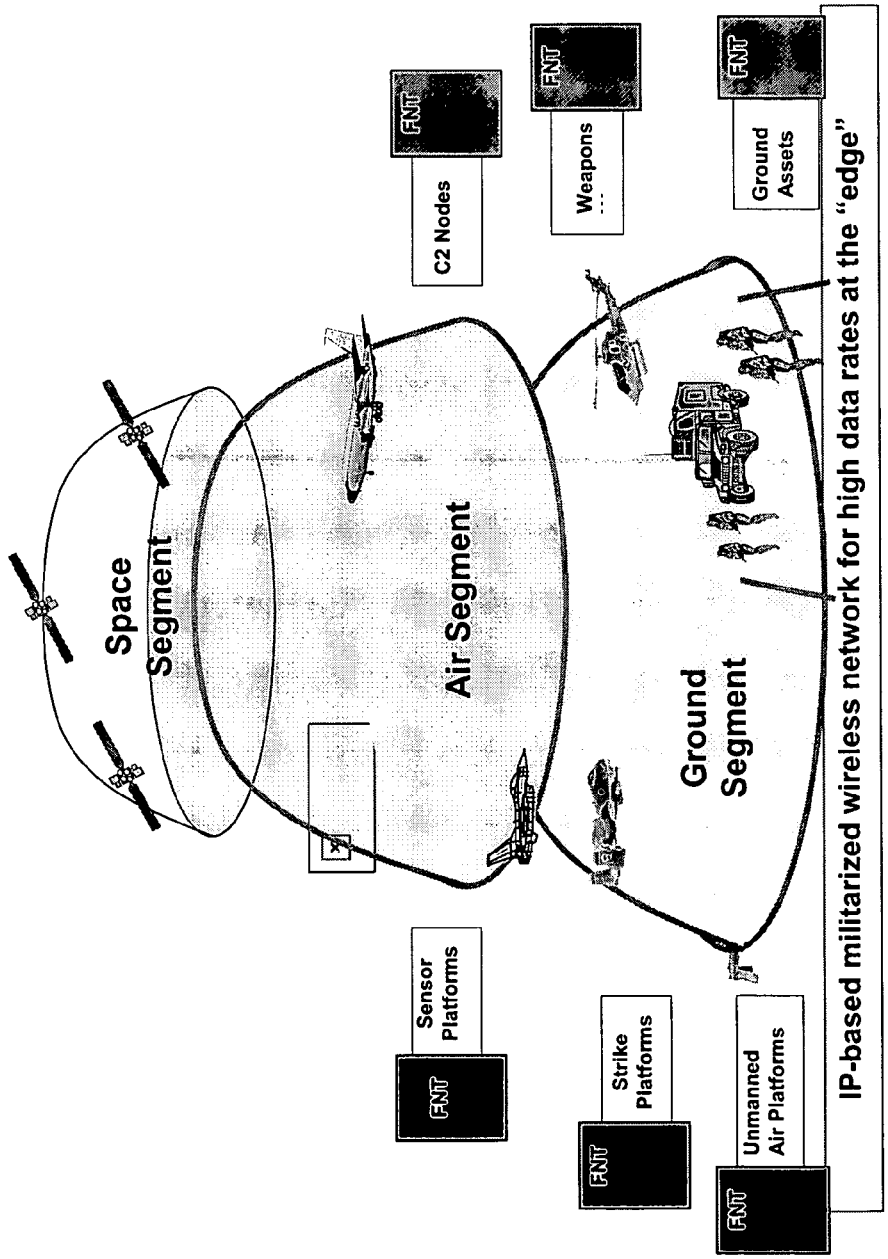
FIG. 31. Network Centric Data Link System Architectures. This diagram highlights interoperability that would be possible if the FNT was integrated into each of the assets. The FNT can link the space, air, and ground segments of the battlespace, and can support satellite network applications.
Figure 32:
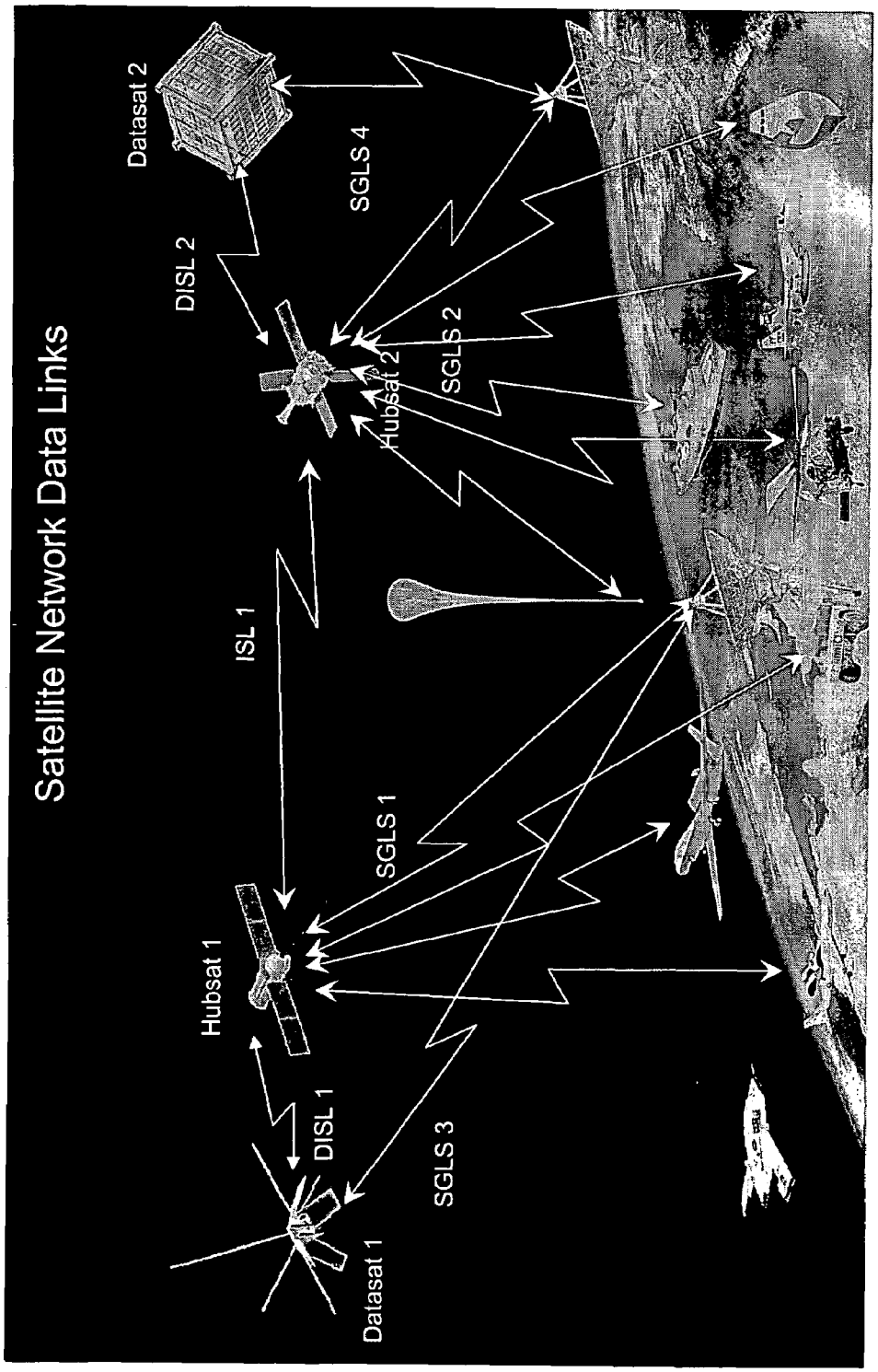
FIG. 32. Satellite Network Data Link. This diagram highlights interoperability that would be possible if the FNT was integrated into each of the assets. The FNT can link the space, air, and ground segments of the battlespace, and can support satellite network applications.

Referring particularly to FIGS. 24-26, the transceiver 20 advantageously supports a beam forming/pointing network and a phased array antenna for beam steering. In one contemplated implementation, for example, the phased array antenna provides active target tracking, a frequency range of 2300 MHz-2400 MHz; a gain of 15 dB; vertical polarization; beam azimuth steering; a sensitivity for tracking of −80 dBm; a beamwidth of less than 20°; and a size of less than 720 cubic inches and a weight of less than 3 pounds.

The phased array antenna system 34 is capable of beam-steering the transmit and receive channels independent of each other. The antenna system 34 has a nominally fixed radiation pattern beamwidth in the elevation and variable radiation pattern in the azimuth for both the transmit and receive channels. The transmit and receive radiation pattern can be electronically steered in azimuth only, i.e., no electronic elevation pattern steering is possible. The intent of the phased array antenna system 34 is to provide the ability to steer the peak of the transmit and receive radiation patterns toward the position of a distant transmitter and receiver and to optimize the energy density on the target by trading directivity in the form of beamwidth. The antenna system 34 includes a transmit antenna 120; a receive antenna 122; and a beam-steering network 126.

The transmit antenna 120 has a nominally fixed radiation pattern beamwidth in elevation and variable radiation pattern beamwidth in the azimuth. The radiation pattern can be electronically steered in azimuth only, i.e., no electronic elevation pattern steering is possible. The intent of the phased array antenna is to provide the ability to steer the peak of the antenna pattern toward the position of a distant transmitter and to optimize the energy density by varying the directivity by tuning the beamwidth. The transmit channel array 120 is capable of . . . The transmit antenna 120 includes a plurality of radiation elements 130; an RF beamsteering processor 132; and a baseband beamsteering processor. The plurality of radiation elements 130 are designed for each of the frequency bands of interest, and, in the illustrated embodiment, there are eight such elements 130. There is a configuration for the L, S, and C bands.

The RF beamsteering processor 132 includes, for each radiation element 130, a bandpass filter 136; a driver amplifier 138; a power amplifier 140; a phase shifter 142; and a shared power divider network 144. The bandpass filters 136, driver amplifiers 138, and power amplifiers 140 are all designed for each of the frequency bands of interest. There are bandpass filters 136, driver amplifiers 138, and power amplifiers 140 for the L, S, and C bands. The phase shifters 142 are voltage controlled. The shared power divider network 144 derives the eight channels from the input S band signal.

The baseband beamsteering processor includes a digital control processor and an automatic gain control processor. The digital control processor generates an analog output phase control signal that steers the main lobe of the transmit antenna's gain to a desired location within approximately +/−20 degrees of 90 degrees, or approximately between 70 degrees and 110 degrees. The digital control processor accepts a desired position from an external source, and generates the necessary analog control voltage to steer the antenna beam to this location. The automatic gain control processor generates an analog output gain control signal that determines the magnitude of the signal power out of the RF signal processing network. The gain of the driver amplifier 138 is varied over a range so that the gain of the antenna 120 is controllable.

The receive antenna 122 has a nominally fixed radiation pattern beamwidth in elevation and variable radiation pattern beamwidth in azimuth. The radiation pattern can be electronically steered in azimuth only, i.e., no electronic elevation pattern steering is possible. The intent of the phased array antenna is to provide the ability to steer the peak of the antenna pattern toward the position of a distant transmitter and to optimize energy density by varying directivity by tuning the beamwidth. The receive channel array 122 is capable of 15+dB of gain and +/−60 degree of beam angle steering. The receive antenna 122 includes a plurality of radiation elements 150; an RF beamsteering processor 152; and a baseband beamsteering processor. The plurality of radiation elements 150 are designed for each of the frequency bands of interest, and, in the illustrated embodiment, there are eight such elements 150. There is a configuration for the L, S, and C bands.

The RF beamsteering processor 152 includes, for each radiation element 150, a bandpass filter 156; a low noise amplifier (LNA) 158; a phase shifter 160; two power combination networks 162 (one per four radiation elements 150); and a single beamforming network 164. The bandpass filters 156 and LNAs 158 are all designed for each of the frequency bands of interest. There are bandpass filters 156 and LNAs 158 for the L, S, and C bands. The phase shifters 160 are voltage controlled. The two power combination networks 162 are each wideband four-to-one RF power combiners, combining four channels for the summing network and four channels for the delta network. The beamforming network 164 includes a two-channel combiner that creates the sum and the difference signals, with the first channel summing four channels and the second creating the difference of four channels.

The baseband beamsteering processor includes a digital control processor and an automatic gain control processor. The digital control processor generates an analog output phase control signal that steers the main lobe of the receive antenna's gain to a desired location within approximately +/−60 degrees of 90 degrees, or approximately between 30 degrees and 160 degrees. The digital control processor accepts a desired position from an external source, and generates the necessary analog control voltage to steer the antenna beam to this location. The automatic gain control processor generates an analog output gain control signal that determines the magnitude of the signal power out of the RF signal processing network. The gain of the LNAs 158 is varied over a range so that the gain of the antenna 122 is controllable.

Applications and Implementations

It will be appreciated that the present invention has broad application in the field of wireless data links, and potential particular applications in the areas of, for example, long range wireless networking; process equipment monitoring and control; facility monitoring and control; machine monitoring and control; system health monitoring; and air, ground, and water mobile data acquisition.

There is a need for adaptive, reconfigurable, networking data links in military training, testing, and operational contexts. For the training exercises utilizing aircraft, weapons, C2ISR, marine craft that cut across test ranges, the FNT can provide interface to the Global Grid for data collection and post performance evaluation. For flight testing the same platforms in joint exercise that extend across test ranges, the same data links can support collection of flight test data. For operational scenarios, where joint battlespace conops and network centric data links are required between the same set of platforms, the FNT can support transfer of command, control, and state of health data. The FNT is extendable across all of these operational contexts.

In a military application context, for example, the transceiver 20 may provide a wireless communication channel between a heretofore unintegrated weapon (e.g., a smart or dumb munition or missile) and various sensor, command and control, intelligence, surveillance, reconnaissance, delivery, ground, and forward targeting platforms. As a result of this integration, information is allowed to move seamlessly across these platforms. In this application, the transceiver 20 advantageously facilitates total situational awareness, a fusion of intelligence and data, an integrated kill-chain process, reduced operator risks, network centric operation, automated machine interfaces, pervasive global connectivity, persistent availability, and integrated information and infrastructure.

The present invention may be implemented as a system of several configured instances of the transceiver 20 creating a long-range (30+ miles) wireless network capable of providing a non-line-of-sight, duplex, multi-hop, communication link between a multi-node stationary or mobile baseband application and a wireless network channel. One node can be interfaced to a land-line or wireless local area network so that the system as a whole can be interfaced to the global Internet backbone. In this manner the subnetwork can be interfaced to the long-haul backbone. Each transceiver 20 in the system implements either node-to-node relay, baseband application communication, or 802.X access point interface to the wireless network. Each transceiver 20 accepts baseband application serial/parallel digital/analog data/signal inputs and transforms these signals so that they are compatible with the transceiver front-end and can be efficiently transmitted across the wireless network gap to another node receiver. The receiver accepts low level wireless signals from another node transmitter and transforms these so they are compatible and changes them to either serial/parallel digital/analog data/signal baseband application outputs.

From the preceding description, it will be appreciated that the transceiver of the present invention provides a number of substantial advantages over the prior art, including, for example, expanding the global information grid by integrating certain classes of mobile and fixed platforms whose generated information was not before integrated and made available to interested information consumers. In achieving this, the transceiver advantageously supports a range of network protocols such as, for example, 802.x, Link 16, or JTRS; a range of communication data rates, data rates, modulation types, and link margins; L, S, C, or X band frequencies; and integrated data security and integrated networking stacks. The transceiver also advantageously includes analog and digital signal processing to make both analog transducers and digital inputs compatible with the transceiver input interface, and both analog output signals and digital output signals compatible with the transceiver output interface. Furthermore, the antenna system can be isotropic for general applications or can be steered so that the transceiver can be pointed in a desired direction or can track moving nodes.

Tables 1-15 are also included in this document and represent wireless link analysis at different platform applications and different FNT Link frequencies. These are provided as rough order of magnitude feasibility analysis for each of the configurations over frequencies of interest.

Although the invention has been described with reference to the preferred embodiments illustrated in the attached drawings, it is noted that equivalents may be employed and substitutions made herein without departing from the scope of the invention. For example, though described as including particular electrical and electronic componentry, the transceiver is not limited to this particular componentry and it is contemplated that suitable substitutions may be made.

TABLE 1

Wireless Link Analysis
Air Platform Applications
FNT Link Analysis @ 800 MHz

| Mobile Air Platform Application | TX Altitude (KM) | TX Altitude (mi) | TX Range (KM) | TX Range (mi) | Link Slant Range (KM) | Link Slant Range (mi) | Link Free Space Path Loss (dBm) | Link Fading Margin (dB) |
|---|---|---|---|---|---|---|---|---|
| Transport Aircraft to Ground Station | 11 | 7 | 80 | 49.6 | 81 | 50 | 128 | 20 |
| Combat Aircraft to Ground Station | 15 | 9 | 80 | 49.6 | 81 | 51 | 128 | 20 |
| C2ISR Aircraft to Ground Station | 27 | 17 | 160 | 99.2 | 162 | 101 | 134 | 14 |
| UAV to Ground Station | 21 | 13 | 160 | 99.2 | 161 | 100 | 134 | 14 |
| High Altitude Airship to Ground Station | 30 | 19 | 80 | 49.6 | 86 | 53 | 128 | 20 |
| Air craft to ATA Missile | 6 | 4 | 32 | 19.84 | 33 | 20 | 120 | 28 |
| Air craft to Guided Bomb | 12 | 8 | 64 | 39.68 | 65 | 40 | 126 | 23 |

TABLE 1-continued

Wireless Link Analysis
Air Platform Applications
FNT Link Analysis @ 800 MHz

| Mobile Air Platform Application | TX Altitude (KM) | TX Altitude (mi) | TX Range (KM) | TX Range (mi) | Link Slant Range (KM) | Link Slant Range (mi) | Link Free Space Path Loss (dBm) | Link Fading Margin (dB) |
|---|---|---|---|---|---|---|---|---|
| Air craft to ATG Missile | 12 | 8 | 80 | 49.6 | 81 | 50 | 128 | 20 |
| From Ground to GTA Missile | 21 | 13 | 32 | 19.84 | 38 | 24 | 120 | 28 |

Assumptions
Link is from air platform transmiter to ground station receiver
Pt = 10 W
Gt = 10 dBi
Gr = 20 dBi
MDS = −85 dBm
Fc = 800 MHz

TABLE 2

Wireless Link Analysis
Air Platform Applications
FNT Link Analysis @ 1500 MHz

| Mobile Air Platform Application | Transmitter Altitude (KM) | Transmitter Altitude (mi) | Transmitter Range (KM) | Transmitter Range (mi) | Link Slant Range (KM) | Link Slant Range (mi) | Link Free Space Path Loss (dBm) | Link Fading Margin (dB) |
|---|---|---|---|---|---|---|---|---|
| Transport Aircraft to Ground Station | 11 | 7 | 80 | 49.6 | 81 | 50 | 134 | 15 |
| Combat Aircraft to Ground Station | 15 | 9 | 80 | 49.6 | 81 | 51 | 134 | 15 |
| C2ISR Aircraft to Ground Station | 27 | 17 | 160 | 99.2 | 162 | 101 | 140 | 9 |
| UAV to Ground Station | 21 | 13 | 160 | 99.2 | 161 | 100 | 140 | 9 |
| High Altitude Airship to Ground Station | 30 | 19 | 80 | 49.6 | 86 | 53 | 134 | 15 |
| Air craft to ATA Missile | 6 | 4 | 32 | 19.84 | 33 | 20 | 127 | 21 |
| Air craft to Guided Bomb | 12 | 8 | 64 | 39.68 | 65 | 40 | 132 | 17 |
| Air craft to ATG Missile | 12 | 8 | 80 | 49.6 | 81 | 50 | 134 | 15 |
| From Ground to GTA Missile | 21 | 13 | 32 | 19.84 | 38 | 24 | 127 | 21 |

Assumptions:
Link is from air platform transmiter to ground station receiver
Pt = 10 W
Gt = 10 dBi
Gr = 20 dBi
MDS = −85 dBm
Fc = 2240 MHz

TABLE 3

Wireless Link Analysis
Air Platform Applications
FNT Link Analysis @ 1500 MHz

| Mobile Air Platform Application | Transmitter Altitude (KM) | Transmitter Altitude (mi) | Transmitter Range (KM) | Transmitter Range (mi) | Link Slant Range (KM) | Link Slant Range (mi) | Link Free Space Path Loss (dBm) | Link Fading Margin (dB) |
|---|---|---|---|---|---|---|---|---|
| Transport Aircraft to Ground Station | 11 | 7 | 80 | 49.6 | 81 | 50 | 137 | 11 |
| Combat Aircraft to Ground Station | 15 | 9 | 80 | 49.6 | 81 | 51 | 137 | 11 |
| C2ISR Aircraft to Ground Station | 27 | 17 | 160 | 99.2 | 162 | 101 | 143 | 5 |
| UAV to Ground Station | 21 | 13 | 160 | 99.2 | 161 | 100 | 143 | 5 |
| High Altitude Airship to Ground Station | 30 | 19 | 80 | 49.6 | 86 | 53 | 138 | 11 |
| Air craft to ATA Missile | 6 | 4 | 32 | 19.84 | 33 | 20 | 129 | 19 |
| Air craft to Guided Bomb | 12 | 8 | 64 | 39.68 | 65 | 40 | 135 | 13 |

TABLE 3-continued

Wireless Link Analysis
Air Platform Applications
FNT Link Analysis @ 1500 MHz

| Mobile Air Platform Application | Transmitter Altitude (KM) | Transmitter Altitude (mi) | Transmitter Range (KM) | Transmitter Range (mi) | Link Slant Range (KM) | Link Slant Range (mi) | Link Free Space Path Loss (dBm) | Link Fading Margin (dB) |
|---|---|---|---|---|---|---|---|---|
| Air craft to ATG Missile | 12 | 8 | 80 | 49.6 | 81 | 50 | 137 | 11 |
| From Ground to GTA Missile | 21 | 13 | 32 | 19.84 | 38 | 24 | 131 | 18 |

Assumptions
Link is from air platform transmiter to ground station receiver
Pt = 10 W
Gt = 10 dBi
Gr = 20 dBi
MDS = −85 dBm
Fc = 2240 MHz

TABLE 4

Wireless Link Analysis
Air Platform Applications
FNT Link Analysis @ 4400 MHz

| Mobile Air Platform Application | Transmitter Altitude (KM) | Transmitter Altitude (mi) | Transmitter Range (KM) | Transmitter Range (mi) | Link Slant Range (KM) | Link Slant Range (mi) | Link Free Space Path Loss (dBm) | Link Fading Margin (dB) |
|---|---|---|---|---|---|---|---|---|
| Transport Aircraft to Ground Station | 11 | 7 | 80 | 49.6 | 81 | 50 | 143 | 5.5 |
| Combat Aircraft to Ground Station | 15 | 9 | 80 | 49.6 | 81 | 51 | 143 | 5.5 |
| C2ISR Aircraft to Ground Station | 27 | 17 | 160 | 99.2 | 162 | 101 | 149 | 0 |
| UAV to Ground Station | 21 | 13 | 160 | 99.2 | 161 | 100 | 149 | 0 |
| High Altitude Airship to Ground Station | 30 | 19 | 80 | 49.6 | 86 | 53 | 143 | 5.5 |
| Air craft to ATA Missile | 6 | 4 | 32 | 19.84 | 33 | 20 | 135 | 13.5 |
| Air craft to Guided Bomb | 12 | 8 | 64 | 39.68 | 65 | 40 | 141 | 7.5 |
| Air craft to ATG Missile | 12 | 8 | 80 | 49.6 | 81 | 50 | 143 | 5.5 |
| From Ground to GTA Missile | 21 | 13 | 32 | 19.84 | 38 | 24 | 137 | 12 |

Assumptions
Link is from air platform transmiter to ground station receiver
Pt = 10 W
Gt = 10 dBi
Gr = 20 dBi
MDS = −85 dBm
Fc = 4400 MHz

TABLE 5

Wireless Link Analysis
Air Platform Applications
FNT Link Analysis @ 8750 MHz

| Mobile Air Platform Application | Transmitter Altitude (KM) | Transmitter Altitude (mi) | Transmitter Range (KM) | Transmitter Range (mi) | Link Slant Range (KM) | Link Slant Range (mi) | Link Free Space Path Loss (dBm) | Link Fading Margin (dB) |
|---|---|---|---|---|---|---|---|---|
| Transport Aircraft to Ground Station | 11 | 7 | 80 | 49.6 | 81 | 50 | 149 | −0.5 |
| Combat Aircraft to Ground Station | 15 | 9 | 80 | 49.6 | 81 | 51 | 149 | −0.5 |
| C2ISR Aircraft to Ground Station | 27 | 17 | 160 | 99.2 | 162 | 101 | 155 | −6.5 |
| UAV to Ground Station | 21 | 13 | 160 | 99.2 | 161 | 100 | 155 | −6.5 |
| High Altitude Airship to Ground Station | 30 | 19 | 80 | 49.6 | 86 | 53 | 149 | −0.5 |
| Air craft to ATA Missile | 6 | 4 | 32 | 19.84 | 33 | 20 | 141 | 7.5 |
| Air craft to Guided Bomb | 12 | 8 | 64 | 39.68 | 65 | 40 | 147 | 1.5 |

TABLE 5-continued

Wireless Link Analysis
Air Platform Applications
FNT Link Analysis @ 8750 MHz

| Mobile Air Platform Application | Transmitter Altitude (KM) | Transmitter Altitude (mi) | Transmitter Range (KM) | Transmitter Range (mi) | Link Slant Range (KM) | Link Slant Range (mi) | Link Free Space Path Loss (dBm) | Link Fading Margin (dB) |
|---|---|---|---|---|---|---|---|---|
| Air craft to ATG Missile | 12 | 8 | 80 | 49.6 | 81 | 50 | 149 | −0.5 |
| From Ground to GTA Missile | 21 | 13 | 32 | 19.84 | 38 | 24 | 141 | 7.5 |

Assumptions
Link is from air platform transmitter to ground station receiver
Pt = 10 W
Gt = 10 dBi
Gr = 20 dBi
MDS = −85 dBm
Fc = 8750 MHz

TABLE 6

Wireless Link Analysis
Ground Platform Applications
FNT Link Analysis @ 800 MHz

| Ground Platform Application | RX Altitude (KM) | RX Altitude (mi) | RX Altitude (ft) | RX Range (KM) | RX Range (mi) | Link Slant Range (KM) | Link Slant Range (mi) | Link Free Space Path Loss (dBm) | Link Fading Margin (dB) |
|---|---|---|---|---|---|---|---|---|---|
| Transport Truck to Aircraft | 27 | 17 | 88583 | 20 | 12.4 | 34 | 21 | 121 | 19 |
| Automobile to LEO | 300 | 186 | 984252 | 160 | 99.2 | 340 | 211 | 141 | −1.1 |
| Armored Personnel Carrier to GEO | 35888 | 22300 | 117742784 | 320 | 198.4 | 35889 | 22301 | 181 | −41 |
| Tank to Aircraft | 15 | 9 | 49213 | 20 | 12.4 | 25 | 16 | 118 | 21 |
| Unmanned Ground Vehicle to UAV | 21 | 13 | 68898 | 20 | 12.4 | 29 | 18 | 119 | 20 |
| Ground Sensor to High Altitude Airship | 30 | 19 | 98425 | 20 | 12.4 | 36 | 22 | 121 | 18 |
| Mobile Troop to LEO | 300 | 186 | 984252 | 320 | 198.4 | 439 | 273 | 143 | −3 |
| Laser Target Marker to Aircraft | 15 | 9 | 49213 | 20 | 12.4 | 25 | 16 | 118 | 21 |
| Ground Environmental Sensor to Aircraft | 27 | 17 | 88583 | 20 | 12.4 | 34 | 21 | 121 | 19 |

Assumptions
Link is from ground transmitter to air platform receiver
Pt = 10 W
Gt = 6 dBi
Gr = 15 dBi
MDS = −85 dBm
Fc = 800 MHz

TABLE 7

Wireless Link Analysis
Ground Platform Applications
FNT Link Analysis @ 1500 MHz

| Ground Platform Application | RX Altitude (KM) | RX Altitude (mi) | RX Altitude (ft) | RX Range (KM) | RX Range (mi) | Link Slant Range (KM) | Link Slant Range (mi) | Link Free Space Path Loss (dBm) | Link Fading Margin (dB) |
|---|---|---|---|---|---|---|---|---|---|
| Transport Truck to Aircraft | 27 | 17 | 88583 | 20 | 12.4 | 34 | 21 | 126 | 13 |
| Automobile to LEO | 300 | 186 | 984252 | 160 | 99.2 | 340 | 211 | 146 | −6 |
| Armored Personnel Carrier to GEO | 35888 | 22300 | 117742784 | 320 | 198.4 | 35889 | 22301 | 187 | −47 |
| Tank to Aircraft | 15 | 9 | 49213 | 20 | 12.4 | 25 | 16 | 124 | 16 |
| Unmanned Ground Vehicle to UAV | 21 | 13 | 68898 | 20 | 12.4 | 29 | 18 | 125 | 15 |
| Ground Sensor to High Altitude Airship | 30 | 19 | 98425 | 20 | 12.4 | 36 | 22 | 126 | 13 |
| Mobile Troop to LEO | 300 | 186 | 984252 | 320 | 198.4 | 439 | 273 | 148 | −9 |
| Laser Target Marker to Aircraft | 15 | 9 | 49213 | 20 | 12.4 | 25 | 16 | 124 | 16 |

TABLE 7-continued

Wireless Link Analysis
Ground Platform Applications
FNT Link Analysis @ 1500 MHz

| Ground Platform Application | RX Altitude (KM) | RX Altitude (mi) | RX Altitude (ft) | RX Range (KM) | RX Range (mi) | Link Slant Range (KM) | Link Slant Range (mi) | Link Free Space Path Loss (dBm) | Link Fading Margin (dB) |
|---|---|---|---|---|---|---|---|---|---|
| Ground Environmental Sensor to Aircraft | 27 | 17 | 88583 | 20 | 12.4 | 34 | 21 | 126 | 13 |

Assumptions
Link is from ground transmitter to air platform receiver
Pt = 10 W
Gt = 6 dBi
Gr = 15 dBi
MDS = −85 dBm
Fc = 1500 MHz

TABLE 8

Wireless Link Analysis
Ground Platform Applications
FNT Link Analysis @ 2240 MHz

| Ground Platform Application | RX Altitude (KM) | RX Altitude (mi) | RX Altitude (ft) | RX Range (KM) | RX Range (mi) | Link Slant Range (KM) | Link Slant Range (mi) | Link Free Space Path Loss (dBm) | Link Fading Margin (dB) |
|---|---|---|---|---|---|---|---|---|---|
| Transport Truck to Aircraft | 27 | 17 | 88583 | 20 | 12.4 | 34 | 21 | 129 | 10 |
| Automobile to LEO | 300 | 186 | 984252 | 160 | 99.2 | 340 | 211 | 150 | −10 |
| Armored Personnel Carrier to GEO | 35888 | 22300 | 117742784 | 320 | 198.4 | 35889 | 22301 | 190 | −50 |
| Tank to Aircraft | 15 | 9 | 49213 | 20 | 12.4 | 25 | 16 | 127 | 12 |
| Unmanned Ground Vehicle to UAV | 21 | 13 | 68898 | 20 | 12.4 | 29 | 18 | 128 | 11 |
| Ground Sensor to High Altitude Airship | 30 | 19 | 98425 | 20 | 12.4 | 36 | 22 | 130 | 10 |
| Mobile Troop to LEO | 300 | 186 | 984252 | 320 | 198.4 | 439 | 273 | 152 | −12 |
| Laser Target Marker to Aircraft | 15 | 9 | 49213 | 20 | 12.4 | 25 | 16 | 127 | 12 |
| Ground Environmental Sensor to Aircraft | 27 | 17 | 88583 | 20 | 12.4 | 34 | 21 | 130 | 10 |

Assumptions
Link is from ground transmitter to air platform receiver
Pt = 10 W
Gt = 6 dBi
Gr = 15 dBi
MDS = −85 dBm
Fc = 2240 MHz

TABLE 9

Wireless Link Analysis
Ground Platform Applications
FNT Link Analysis @ 4400 MHz

| Ground Platform Application | RX Altitude (KM) | RX Altitude (mi) | RX Altitude (ft) | RX Range (KM) | RX Range (mi) | Link Slant Range (KM) | Link Slant Range (mi) | Link Free Space Path Loss (dBm) | Link Fading Margin (dB) |
|---|---|---|---|---|---|---|---|---|---|
| Transport Truck to Aircraft | 27 | 17 | 88583 | 20 | 12.4 | 34 | 21 | 135 | 4 |
| Automobile to LEO | 300 | 186 | 984252 | 160 | 99.2 | 340 | 211 | 155 | −15 |
| Armored Personnel Carrier to GEO | 35888 | 22300 | 117742784 | 320 | 198.4 | 35889 | 22301 | 196 | −56 |
| Tank to Aircraft | 15 | 9 | 49213 | 20 | 12.4 | 25 | 16 | 133 | 6.4 |
| Unmanned Ground Vehicle to UAV | 21 | 13 | 68898 | 20 | 12.4 | 29 | 18 | 134 | 5.4 |
| Ground Sensor to High Altitude Airship | 30 | 19 | 98425 | 20 | 12.4 | 36 | 22 | 136 | 4 |
| Mobile Troop to LEO | 300 | 186 | 984252 | 320 | 198.4 | 439 | 273 | 158 | −18 |
| Laser Target Marker to Aircraft | 15 | 9 | 49213 | 20 | 12.4 | 25 | 16 | 133 | 6.4 |

TABLE 9-continued

Wireless Link Analysis
Ground Platform Applications
FNT Link Analysis @ 4400 MHz

| Ground Platform Application | RX Altitude (KM) | RX Altitude (mi) | RX Altitude (ft) | RX Range (KM) | RX Range (mi) | Link Slant Range (KM) | Link Slant Range (mi) | Link Free Space Path Loss (dBm) | Link Fading Margin (dB) |
|---|---|---|---|---|---|---|---|---|---|
| Ground Environmental Sensor to Aircraft | 27 | 17 | 88583 | 20 | 12.4 | 34 | 21 | 135 | 4 |

Assumptions
Link is from ground transmitter to air platform receiver
Pt = 10 W
Gt = 6 dBi
Gr = 15 dBi
MDS = −85 dBm
Fc = 4400 MHz

TABLE 10

Wireless Link Analysis
Ground Platform Applications
FNT Link Analysis @ 8750 MHz

| Ground Platform Application | RX Altitude (KM) | RX Altitude (mi) | RX Altitude (ft) | RX Range (KM) | RX Range (mi) | Link Slant Range (KM) | Link Slant Range (mi) | Link Free Space Path Loss (dBm) | Link Fading Margin (dB) |
|---|---|---|---|---|---|---|---|---|---|
| Transport Truck to Aircraft | 27 | 17 | 88583 | 20 | 12.4 | 34 | 21 | 141 | −2 |
| Automobile to LEO | 300 | 186 | 984252 | 160 | 99.2 | 340 | 211 | 161 | −22 |
| Armored Personnel Carrier to GEO | 35888 | 22300 | 117742784 | 320 | 198.4 | 35889 | 22301 | 202 | −62 |
| Tank to Aircraft | 15 | 9 | 49213 | 20 | 12.4 | 25 | 16 | 139 | 0.5 |
| Unmanned Ground Vehicle to UAV | 21 | 13 | 68898 | 20 | 12.4 | 29 | 18 | 140 | −0.5 |
| Ground Sensor to High Altitude Airship | 30 | 19 | 98425 | 20 | 12.4 | 36 | 22 | 142 | −2.2 |
| Mobile Troop to LEO | 300 | 186 | 984252 | 320 | 198.4 | 439 | 273 | 164 | −24 |
| Laser Target Marker to Aircraft | 15 | 9 | 49213 | 20 | 12.4 | 25 | 16 | 139 | 0.5 |
| Ground Environmental Sensor to Aircraft | 27 | 17 | 88583 | 20 | 12.4 | 34 | 21 | 141 | −2 |

Assumptions
Link is from ground transmitter to air platform receiver
Pt = 10 W
Gt = 6 dBi
Gr = 15 dBi
MDS = −85 dBm
Fc = 8750 MHz

TABLE 11

Wireless Link Analysis
Marine Platform Applications
FNT Link Analysis @ 800 MHz

| Mobile Air Platform Application | RX Altitude (KM) | RX Altitude (mi) | RX Range (KM) | RX Range (mi) | Link Slant Range (KM) | Link Slant Range (mi) | Link Free Space Path Loss (dBm) | Link Fading Margin (dB) |
|---|---|---|---|---|---|---|---|---|
| Ship to Ship | 0.05 | 0 | 80 | 49.6 | 80 | 50 | 128 | 30 |
| Ship to LEO | 650 | 404 | 160 | 99.2 | 669 | 416 | 147 | 12 |
| Ship to STA Missile | 300 | 186 | 160 | 99.2 | 340 | 211 | 141 | 18 |
| Ship to GEO | 35888 | 22300 | 320 | 198.4 | 35889 | 22301 | 181 | −22 |
| Ship to Aircraft | 15 | 9 | 160 | 99.2 | 161 | 100 | 134 | 24 |
| Ship to UAV | 21 | 13 | 160 | 99.2 | 161 | 100 | 134 | 24 |

TABLE 11-continued

Wireless Link Analysis
Marine Platform Applications
FNT Link Analysis @ 800 MHz

| Mobile Air Platform Application | RX Altitude (KM) | RX Altitude (mi) | RX Range (KM) | RX Range (mi) | Link Slant Range (KM) | Link Slant Range (mi) | Link Free Space Path Loss (dBm) | Link Fading Margin (dB) |
|---|---|---|---|---|---|---|---|---|
| Surface Sensor to LEO | 650 | 404 | 160 | 99.2 | 669 | 416 | 147 | 12 |
| Surface Sensor to UAV | 21 | 13 | 160 | 99.2 | 161 | 100 | 134 | 24 |
| Ship to Airship | 30 | 19 | 160 | 99.2 | 163 | 101 | 134 | 24 |

Assumptions
Link is from marine platform transmiter to airplatform receiver
Pt = 10 W
Gt = 25 dBi
Gr = 15 dBi
MDS = −85 dBm
Fc = 800 MHz

TABLE 12

Wireless Link Analysis
Marine Platform Applications
FNT Link Analysis @ 1500 MHz

| Mobile Air Platform Application | Receiver Altitude (KM) | Receiver Altitude (mi) | Receiver Range (KM) | Receiver Range (mi) | Link Slant Range (KM) | Link Slant Range (mi) | Link Free Space Path Loss (dBm) | Link Fading Margin (dB) |
|---|---|---|---|---|---|---|---|---|
| Ship to Ship | 0.05 | 0 | 80 | 49.6 | 80 | 50 | 134 | 25 |
| Ship to LEO | 650 | 404 | 160 | 99.2 | 669 | 416 | 152 | 6.5 |
| Ship to STA Missile | 300 | 186 | 160 | 99.2 | 340 | 211 | 146 | 12 |
| Ship to GEO | 35888 | 22300 | 320 | 198.4 | 35889 | 22301 | 187 | −28 |
| Ship to Aircraft | 15 | 9 | 160 | 99.2 | 161 | 100 | 140 | 19 |
| Ship to UAV | 21 | 13 | 160 | 99.2 | 161 | 100 | 140 | 19 |
| Surface Sensor to LEO | 650 | 404 | 160 | 99.2 | 669 | 416 | 152 | 6.5 |
| Surface Sensor to UAV | 21 | 13 | 160 | 99.2 | 161 | 100 | 140 | 19 |
| Ship to Airship | 30 | 19 | 160 | 99.2 | 163 | 101 | 140 | 19 |

Assumptions
Link is from marine platform transmiter to airplatform receiver
Pt = 10 W
Gt = 25 dBi
Gr = 15 dBi
MDS = −85 dBm
Fc = 2240 MHz

TABLE 13

Wireless Link Analysis
Marine Platform Applications
FNT Link Analysis @ 1500 MHz

| Mobile Air Platform Application | Receiver Altitude (KM) | Receiver Altitude (mi) | Receiver Range (KM) | Receiver Range (mi) | Link Slant Range (KM) | Link Slant Range (mi) | Link Free Space Path Loss (dBm) | Link Fading Margin (dB) |
|---|---|---|---|---|---|---|---|---|
| Ship to Ship | 0.05 | 0 | 80 | 49.6 | 80 | 50 | 137 | 21 |
| Ship to LEO | 650 | 404 | 160 | 99.2 | 669 | 416 | 155 | 3 |
| Ship to STA Missile | 300 | 186 | 160 | 99.2 | 340 | 211 | 150 | 9 |
| Ship to GEO | 35888 | 22300 | 320 | 198.4 | 35889 | 22301 | 190 | −31 |
| Ship to Aircraft | 15 | 9 | 160 | 99.2 | 161 | 100 | 143 | 15 |
| Ship to UAV | 21 | 13 | 160 | 99.2 | 161 | 100 | 143 | 15 |
| Surface Sensor to LEO | 650 | 404 | 160 | 99.2 | 669 | 416 | 155 | 3 |

TABLE 13-continued

Wireless Link Analysis
Marine Platform Applications
FNT Link Analysis @ 1500 MHz

| Mobile Air Platform Application | Receiver Altitude (KM) | Receiver Altitude (mi) | Receiver Range (KM) | Receiver Range (mi) | Link Slant Range (KM) | Link Slant Range (mi) | Link Free Space Path Loss (dBm) | Link Fading Margin (dB) |
|---|---|---|---|---|---|---|---|---|
| Surface Sensor to UAV | 21 | 13 | 160 | 99.2 | 161 | 100 | 143 | 15 |
| Ship to Airship | 30 | 19 | 160 | 99.2 | 163 | 101 | 143 | 15 |

Assumptions
Link is from marine platform transmiter to airplatform receiver
Pt = 10 W
Gt = 25 dBi
Gr = 15 dBi
MDS = −85 dBm
Fc = 2240 MHz

TABLE 14

Wireless Link Analysis
Marine Platform Applications
FNT Link Analysis @ 4400 MHz

| Mobile Air Platform Application | Receiver Altitude (KM) | Receiver Altitude (mi) | Receiver Range (KM) | Receiver Range (mi) | Link Slant Range (KM) | Link Slant Range (mi) | Link Free Space Path Loss (dBm) | Link Fading Margin (dB) |
|---|---|---|---|---|---|---|---|---|
| Ship to Ship | 0.05 | 0 | 80 | 49.6 | 80 | 50 | 143 | 15 |
| Ship to LEO | 650 | 404 | 160 | 99.2 | 669 | 416 | 161 | −3 |
| Ship to STA Missile | 300 | 186 | 160 | 99.2 | 340 | 211 | 155 | 3 |
| Ship to GEO | 35888 | 22300 | 320 | 198.4 | 35889 | 22301 | 196 | −37 |
| Ship to Aircraft | 15 | 9 | 160 | 99.2 | 161 | 100 | 149 | 9.5 |
| Ship to UAV | 21 | 13 | 160 | 99.2 | 161 | 100 | 149 | 9.5 |
| Surface Sensor to LEO | 650 | 404 | 160 | 99.2 | 669 | 416 | 161 | −3 |
| Surface Sensor to UAV | 21 | 13 | 160 | 99.2 | 161 | 100 | 149 | 9.5 |
| Ship to Airship | 30 | 19 | 160 | 99.2 | 163 | 101 | 149 | 9.5 |

Assumptions
Link is from marine platform transmiter to airplatform receiver
Pt = 10 W
Gt = 25 dBi
Gr = 15 dBi
MDS = −85 dBm
Fc = 4400 MHz

TABLE 15

Wireless Link Analysis
Marine Platform Applications
FNT Link Analysis @ 8750 MHz

| Mobile Air Platform Application | Receiver Altitude (KM) | Receiver Altitude (mi) | Receiver Range (KM) | Receiver Range (mi) | Link Slant Range (KM) | Link Slant Range (mi) | Link Free Space Path Loss (dBm) | Link Fading Margin (dB) |
|---|---|---|---|---|---|---|---|---|
| Ship to Ship | 0.05 | 0 | 80 | 49.6 | 80 | 50 | 149 | 9.5 |
| Ship to LEO | 650 | 404 | 160 | 99.2 | 669 | 416 | 167 | −9 |
| Ship to STA Missile | 300 | 186 | 160 | 99.2 | 340 | 211 | 161 | −3 |
| Ship to GEO | 35888 | 22300 | 320 | 198.4 | 35889 | 22301 | 202 | −43 |
| Ship to Aircraft | 15 | 9 | 160 | 99.2 | 161 | 100 | 155 | 3.5 |
| Ship to UAV | 21 | 13 | 160 | 99.2 | 161 | 100 | 155 | 3.5 |
| Surface Sensor to LEO | 650 | 404 | 160 | 99.2 | 669 | 416 | 167 | −9 |

TABLE 15-continued

Wireless Link Analysis
Marine Platform Applications
FNT Link Analysis @ 8750 MHz

| Mobile Air Platform Application | Receiver Altitude (KM) | Receiver Altitude (mi) | Receiver Range (KM) | Receiver Range (mi) | Link Slant Range (KM) | Link Slant Range (mi) | Link Free Space Path Loss (dBm) | Link Fading Margin (dB) |
|---|---|---|---|---|---|---|---|---|
| Surface Sensor to UAV | 21 | 13 | 160 | 99.2 | 161 | 100 | 155 | 3.5 |
| Ship to Airship | 30 | 19 | 160 | 99.2 | 163 | 101 | 155 | 3.5 |

Assumptions
Link is from marine platform transmiter to airplatform receiver
Pt = 10 W
Gt = 25 dBi
Gr = 15 dBi
MDS = −85 dBm
Fc = 8750 MHz

I claim:

1. A receiver for amplifying a received RF signal, extracting data from a modulating signal component of the received RF signal, and converting the data to a serial data stream with a corresponding synchronous clock, the receiver comprising:
   a control and configuration interface for controlling operation and configuration of the receiver;
   a low noise amplifier for amplifying the received RF signal while minimizing any noise effects, thereby producing a sufficient signal-to-noise ratio so that the modulating signal component can be extracted from the received RF signal;
   a frequency downconverter for translating the modulating signal component down to a standard first intermediate frequency;
   a demodulator for digitizing, filtering, and processing the intermediate frequency signal to extract the data therefrom; and
   a mass storage unit for digitizing at a particular sample rate the intermediate frequency signal from the frequency downconverter to produce a sample, and for storing the sample for subsequent analysis.

2. The receiver as set forth in 1, wherein receiver supports a data rate approximately between 2 Mbps and 40 Mbps and can demodulate a PCM data stream in this range; provides a data clock that is synchronous with the PCM data stream; and supports demodulation of FSK modulation and SOQPSK modulation and can be adapted to support CPM modulation.

3. The receiver as set forth in 1, wherein the received RF signal is a low level RF signal in the L, S, or C band.

4. The receiver as set forth in 1, wherein the low noise amplifier, frequency downconverter, demodulator, and mass storage unit are made modular in order to facilitate substitution.

5. The receiver as set forth in 4, wherein the low noise amplifier, frequency downconverter, demodulator, and mass storage unit are each provided with a modular mechanical enclosure so as to be separately distributable relative to the other modular mechanical enclosures.

6. The receiver as set forth in 5, wherein the modular mechanical enclosures-support isolated and non-isolated mounting configurations.

7. The receiver as set forth in 1, wherein the configuration interface allows for adaptability in real-time so that the receiver is dynamically configurable for changing data rates, modulation types, selectivity, intermediate frequency signal gain and bandwidth, intermediate frequency signal frequency, sample rate, video bandwidth, and video gain, and to configure RF gain and manage noise performance.

8. The receiver as set forth in 1, wherein the low noise amplifier includes a plurality of gain and filter stages, with each such gain and filter stage including a low noise fixed gain amplifier and a fixed bandpass filter.

9. The receiver as set forth in 1, wherein the frequency downconverter includes a fixed frequency downconverter having three independent output channels, with each output channel having an output frequency and being associated with a frequency synthesizer so that the output frequency can be independently managed.

10. The receiver as set forth in 9, wherein, the frequency downconverter includes a translation and gain stage providing frequency translation and adaptable gain for each output channel.

11. The receiver as set forth in 1, wherein the demodulator includes a switchable variable filtering/gain section, an I/Q analog-to-digital converter, and a real-time demodulation processor.

12. The receiver as set forth in 1, wherein the demodulator uses reconfigurable CPLD technology adaptable to support a plurality of advanced modulation types.

13. The receiver as set forth in 1, wherein the sample rate of the mass storage unit can be configured to cover a range of intermediate frequency signal rates.

14. The receiver as set forth in 1, wherein the mass storage unit includes a deep-flash memory subsystem which enables storage of time records approximately between 10 minutes and 30 minutes long depending on the sample rate.

15. The receiver as set forth in 1, wherein the mass storage unit includes a standard USB interface for transferring data to a personal computer.

16. A receiver for use in a data link transceiver having a communication processor, wherein the receiver is a data communication RF/microwave receiver able to convert a received RF signal to a baseband digital signal useable by the communication processor, the receiver comprising:
   a control and configuration interface for controlling operation and configuration of the receiver;
   a low noise amplifier for amplifying the received RF signal while minimizing any noise effects, thereby producing a sufficient signal-to-noise ratio so that a modulating signal component can be extracted from the received RF signal;
a frequency downconverter for translating the modulating signal component down to a standard first intermediate frequency;
a demodulator for digitizing, filtering, and processing the intermediate frequency signal to create the baseband digital signal for the communication processor; and
a mass storage unit for digitizing at a particular sample rate the intermediate frequency signal from the frequency downconverter to produce a sample, and for storing the sample for subsequent digital signal analysis.

17. A transceiver for allowing two-way wireless communication between a baseband application and one or more other nodes of a wireless network, the transceiver comprising:
a communication processor for managing a communication process between the baseband application and the wireless network;
a receiver for amplifying a RF signal received on a receive channel from the wireless network, extracting data from a modulating signal component of the RF signal, and converting the data to a serial data stream with a corresponding synchronous clock;
a transmitter for providing an transmit channel from the communication processor and for providing a wireless network channel, and for converting a digital output of the communication processor to RF signals compatible with the wireless network channel;
a power conversion and regulation mechanism for providing power regulation and voltage conversion between a power source and the transceiver;
a diplexer for isolating the receive and transmit channels; and
a phased array antenna system including a beam forming/pointing network and a phased array antenna for beam-steering a receive radiation pattern associated with the receive channel and an transmit radiation pattern associated with the transmit channel.

18. The transceiver as set forth in 17, wherein the baseband application is associated with a mobile platform.

19. The transceiver as set forth in 17, wherein the transceiver supports a plurality of network protocols, communication data rates, data rates, modulation types, and link margins, and also supports L or S band frequencies.

20. The transceiver as set forth in 17, wherein the receiver, transmitter, and phased array antenna system are each provided in at least one modular enclosure that is separately distributable relative to the other modular enclosures.

21. The transceiver as set forth in 17, wherein the communication processor translates data from the baseband application to have appropriate embedded control characters, addresses, and encryption so that the baseband application is made compatible with a particular wireless network protocol.

22. The transceiver as set forth in 17, wherein the communication processor includes—
a network communication stack including—
a media access control manager and a physical layer service manager that cooperate to form a wireless network station, and
an application service manager for supporting a bidirectional baseband analog or digital signal interface for data acquisition, and for supporting a data port so that the communication processor can serve as a gateway access point for long-haul Internet services, thereby enabling the nodes of the wireless network to distribute data across a wide area network; and
a communication manager for enabling an external control and configuration interface for the communication processor.

23. The transceiver as set forth in 17, wherein the communication processor makes the wireless network transparent to higher level protocols and user applications.

24. The transceiver as set forth in 17, wherein the transmitter includes—
a digital modulator adapted to receive a single-ended data input and a differential data input, thereby allowing the transmitter to be physically distributed while still routing high-speed signals from a remote source and the digital modulator;
a variable gain power driver amplifier; and
a final power amplifier.

25. The transceiver as set forth in 17, wherein the power conversion and regulation mechanism provides a power management function enabling the transceiver to be put into a sleep mode in order to conserve power.

26. The transceiver as set forth in 17, wherein the diplexer includes separate bandpass filter networks for the receive and transmit channels, thereby enabling both the receive and transmit channels to coexist on the phased array antenna system.

27. The transceiver as set forth in 17, wherein the phased array antenna system is capable of beam-steering the receive and transmit channels independent of each other.

28. The transceiver as set forth in 17, wherein the receive and transmit radiation patterns can be electronically steered in azimuth only.

* * * * *